US012756427B2

(12) United States Patent
Elshafie et al.

(10) Patent No.: US 12,756,427 B2
(45) Date of Patent: Oct. 6, 2026

(54) RECONFIGURABLE INTELLIGENT SURFACE (RIS) RESERVATION FOR SIDELINK COMMUNICATIONS

(71) Applicant: QUALCOMM Incorporated, San Diego, CA (US)

(72) Inventors: Ahmed Elshafie, San Diego, CA (US); Yu Zhang, San Diego, CA (US); Seyedkianoush Hosseini, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 18/697,699

(22) PCT Filed: Dec. 29, 2021

(86) PCT No.: PCT/CN2021/142301

§ 371 (c)(1),
(2) Date: Apr. 1, 2024

(87) PCT Pub. No.: WO2023/123007

PCT Pub. Date: Jul. 6, 2023

(65) Prior Publication Data

US 2025/0233622 A1 Jul. 17, 2025

(51) Int. Cl.
*H04B 7/04* (2017.01)
*H04B 7/06* (2006.01)
*H04W 72/25* (2023.01)

(52) U.S. Cl.
CPC ..... *H04B 7/04013* (2023.05); *H04B 7/06952* (2023.05); *H04W 72/25* (2023.01)

(58) Field of Classification Search
CPC .......... H04B 7/04013; H04B 7/06952; H04W 72/25; H04W 24/02
See application file for complete search history.

(56) References Cited

U.S. PATENT DOCUMENTS

2021/0045103 A1 2/2021 Kim et al.
2021/0344384 A1 11/2021 Dunna et al.
(Continued)

FOREIGN PATENT DOCUMENTS

CN 112910807 A 6/2021
CN 113747464 A 12/2021
CN 113810083 A 12/2021

OTHER PUBLICATIONS

International Search Report and Written Opinion—PCT/CN2021/142301—ISA/EPO—Jul. 27, 2022.

*Primary Examiner* — Eric Myers
(74) *Attorney, Agent, or Firm* — Seyfarth Shaw LLP

(57) ABSTRACT

A method for wireless communication by a first sidelink (SL) user equipment (UE) includes receiving a reservation confirmation message indicating an assignment of a reconfigurable intelligent surface (RIS) to the first SL UE. The method also includes receiving a communication window message indicating a period of time associated with the assignment. The method further includes transmitting, within the period of time, a beam training sequence for beam training the RIS to identify a beam index, of multiple beam indices, that satisfies one or more beam selection criteria. The method still further includes transmitting, within the period of time via a beam associated with the beam index, data intended for transmission to a second SL UE via the RIS.

30 Claims, 15 Drawing Sheets

(56) References Cited

U.S. PATENT DOCUMENTS

| | | | | |
|---|---|---|---|---|
| 2023/0146485 | A1* | 5/2023 | Jian | H04B 7/04013<br>455/11.1 |
| 2023/0396299 | A1* | 12/2023 | Yang | H04L 5/0053 |
| 2024/0048187 | A1* | 2/2024 | Sun | H04B 17/27 |
| 2024/0250720 | A1* | 7/2024 | Shen | H04B 7/0473 |

* cited by examiner

RECONFIGURABLE INTELLIGENT SURFACE (RIS) RESERVATION FOR SIDELINK COMMUNICATIONS

FIELD OF THE DISCLOSURE

The present disclosure relates generally to wireless communications, and more particularly to reserving a reconfigurable intelligent surface (RIS) for sidelink communications between two or more sidelink user equipment (UEs).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (for example, with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the fourth generation (4G) long term evolution (LTE) standard. Narrowband (NB)-Internet of things (IoT) and enhanced machine-type communications (eMTC) are a set of enhancements to LTE for machine type communications. There exists a need for further improvements in 5G NR technology. These improvements may also be applicable to other multi-access technologies and the telecommunications standards that employ these technologies.

Wireless communications systems may include or provide support for various types of communications, including device-to-device (D2D) communications over a D2D wireless link, such as a sidelink channel. The communications on a sidelink channel may be referred to as sidelink communications. Resources for sidelink communications may be selected by a sidelink user equipment (UE) from one or more groups of sidelink resources (for example, sidelink resource pools) or scheduled by a base station.

In some wireless networks, passive multiple-input and multiple-output (MIMO) antenna units may replace one or more active antenna units. A reconfigurable intelligent surface (RIS) is an example of a passive MIMO antenna unit. The RIS may be an electromagnetic material controlled by a wireless device, such as a base station, to extend coverage of a wireless network with little impact on total power consumption of a wireless system associated with the wireless network. As the demands for sidelink communications increase, sidelink UEs may reserve one or more RISs to perform sidelink communications.

SUMMARY

In one aspect of the present disclosure, a method for wireless communication by a first sidelink (SL) user equipment (UE) is presented. The method includes receiving a reservation confirmation message indicating an assignment of a reconfigurable intelligent surface (RIS) to the first SL UE. The method further includes receiving a communication window message indicating a period of time associated with the assignment. The method still further includes transmitting, within the period of time, a beam training sequence for beam training the RIS to identify a beam index, of multiple beam indices, that satisfies one or more beam selection criteria. The method also includes transmitting, within the period of time via a beam associated with the beam index, data intended for transmission to a second SL UE via the RIS.

Another aspect of the present disclosure is directed to an apparatus including means for receiving a reservation confirmation message indicating an assignment of a RIS to the first SL UE. The apparatus further includes means for receiving a communication window message indicating a period of time associated with the assignment. The apparatus still further includes means for transmitting, within the period of time, a beam training sequence for beam training the RIS to identify a beam index, of multiple beam indices, that satisfies one or more beam selection criteria. The apparatus also includes means for transmitting, within the period of time via a beam associated with the beam index, data intended for transmission to a second SL UE via the RIS.

In another aspect of the present disclosure, a non-transitory computer-readable medium with non-transitory program code recorded thereon is disclosed. The program code is executed by a processor and includes program code to receive a reservation confirmation message indicating an assignment of a RIS to the first SL UE. The program code further includes program code to receive a communication window message indicating a period of time associated with the assignment. The program code still further includes program code to transmit, within the period of time, a beam training sequence for beam training the RIS to identify a beam index, of multiple beam indices, that satisfies one or more beam selection criteria. The program code also includes program code to transmit, within the period of time via a beam associated with the beam index, data intended for transmission to a second SL UE via the RIS.

Another aspect of the present disclosure is directed to an apparatus for wireless communication at a first SL UE. The apparatus includes a memory coupled with the processor and storing instructions operable, when executed by the processor, to cause the apparatus to receive a reservation confirmation message indicating an assignment of a RIS to the first SL UE. Execution of the instructions further cause the apparatus to receive a communication window message indicating a period of time associated with the assignment. Execution of the instructions also cause the apparatus to transmit, within the period of time, a beam training sequence for beam training the RIS to identify a beam index, of multiple beam indices, that satisfies one or more beam selection criteria. Execution of the instructions still further cause the apparatus to configured to transmit, within the period of time via a beam associated with the beam index, data intended for transmission to a second SL UE via the RIS.

In one aspect of the present disclosure, a method for wireless communication by a RIS is presented. The method includes receiving, from a first SL UE, a reservation message requesting reservation of the RIS. The method further includes transmitting, to the first SL UE, a reservation confirmation message indicating an assignment of the RIS to the first SL UE based on receiving the reservation message. The method still further includes transmitting, to the first SL UE, a communication window message indicating a period of time associated with the assignment. The method also includes receiving, within the period of time, a beam training sequence for beam training the RIS to identify a beam index, of multiple beam indices, that satisfies one or more beam selection criteria. The method further includes transmitting, to the first SL UE, a beam selection message indicating the beam index. The method still further includes receiving, within the period of time from the first SL UE via a beam associated with the beam index, data intended for transmission to a second SL UE.

Another aspect of the present disclosure is directed to an apparatus including means for receiving, from a first SL UE, a reservation message requesting reservation of the RIS. The apparatus further includes means for transmitting, to the first SL UE, a reservation confirmation message indicating an assignment of the RIS to the first SL UE based on receiving the reservation message. The apparatus still further includes means for transmitting, to the first SL UE, a communication window message indicating a period of time associated with the assignment. The apparatus also includes means for receiving, within the period of time, a beam training sequence for beam training the RIS to identify a beam index, of multiple beam indices, that satisfies one or more beam selection criteria. The apparatus further includes means for transmitting, to the first SL UE, a beam selection message indicating the beam index. The apparatus still further includes means for receiving, within the period of time from the first SL UE via a beam associated with the beam index, data intended for transmission to a second SL UE.

In another aspect of the present disclosure, a non-transitory computer-readable medium with non-transitory program code recorded thereon is disclosed. The program code is executed by a processor and includes program code to receive, from a first SL UE, a reservation message requesting reservation of the RIS. The program code further includes program code to transmit, to the first SL UE, a reservation confirmation message indicating an assignment of the RIS to the first SL UE based on receiving the reservation message. The program code still further includes program code to transmit, to the first SL UE, a communication window message indicating a period of time associated with the assignment. The program code also includes program code to receive, within the period of time, a beam training sequence for beam training the RIS to identify a beam index, of multiple beam indices, that satisfies one or more beam selection criteria. The program code further includes program code to transmit, to the first SL UE, a beam selection message indicating the beam index. The program code still further includes program code to receive, within the period of time from the first SL UE via a beam associated with the beam index, data intended for transmission to a second SL UE.

Another aspect of the present disclosure is directed to an apparatus for wireless communication at a RIS. The apparatus includes a memory coupled with the processor and storing instructions operable, when executed by the processor, to cause the apparatus to receive, from a first SL UE, a reservation message requesting reservation of the RIS. Execution of the instructions further cause the apparatus to transmit, to the first SL UE, a reservation confirmation message indicating an assignment of the RIS to the first SL UE based on receiving the reservation message. Execution of the instructions also cause the apparatus to transmit, to the first SL UE, a communication window message indicating a period of time associated with the assignment. Execution of the instructions still further cause the apparatus to receive, within the period of time, a beam training sequence for beam training the RIS to identify a beam index, of multiple beam indices, that satisfies one or more beam selection criteria. Execution of the instructions also cause the apparatus to transmit, to the first SL UE, a beam selection message indicating the beam index. Execution of the instructions further cause the apparatus to configured to receive, within the period of time from the first SL UE via a beam associated with the beam index, data intended for transmission to a second SL UE.

In one aspect of the present disclosure, a method for wireless communication by a base station is presented. The method includes transmitting, to a first SL UE, a reservation confirmation message indicating an assignment of a RIS to the first SL UE. The method further includes transmitting, to the first SL UE, a communication window message indicating a period of time associated with the assignment. The method still further includes receiving, from the RIS, a first beam selection message indicating a beam index, of a plurality of beam indices, that satisfies one or more beam selection criteria. The method also includes transmitting, to the first SL UE, a second beam selection message indicating the beam index.

Another aspect of the present disclosure is directed to an apparatus including means for transmitting, to a first SL UE, a reservation confirmation message indicating an assignment of a RIS to the first SL UE. The apparatus further includes means for transmitting, to the first SL UE, a communication window message indicating a period of time associated with the assignment. The apparatus still further includes means for receiving, from the RIS, a first beam selection message indicating a beam index, of a plurality of beam indices, that satisfies one or more beam selection criteria. The apparatus also includes means for transmitting, to the first SL UE, a second beam selection message indicating the beam index.

In another aspect of the present disclosure, a non-transitory computer-readable medium with non-transitory program code recorded thereon is disclosed. The program code is executed by a processor and includes program code to transmit, to a first SL UE, a reservation confirmation message indicating an assignment of a RIS to the first SL UE. The program code further includes program code to transmit, to the first SL UE, a communication window message indicating a period of time associated with the assignment. The program code still further includes program code to receive, from the RIS, a first beam selection message indicating a beam index, of a plurality of beam indices, that satisfies one or more beam selection criteria. The program code also includes program code to transmit, to the first SL UE, a second beam selection message indicating the beam index.

Another aspect of the present disclosure is directed to an apparatus for wireless communication at a base station. The apparatus includes a memory coupled with the processor and storing instructions operable, when executed by the processor, to cause the apparatus to transmit, to a first SL UE, a reservation confirmation message indicating an assignment of a RIS to the first SL UE. Execution of the instructions also cause the apparatus to transmit, to the first SL UE, a communication window message indicating a period of time associated with the assignment. Execution of the instructions further cause the apparatus to receive, from the RIS, a first beam selection message indicating a beam index, of a plurality of beam indices, that satisfies one or more beam selection criteria. Execution of the instructions still further cause the apparatus to transmit, to the first SL UE, a second beam selection message indicating the beam index.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
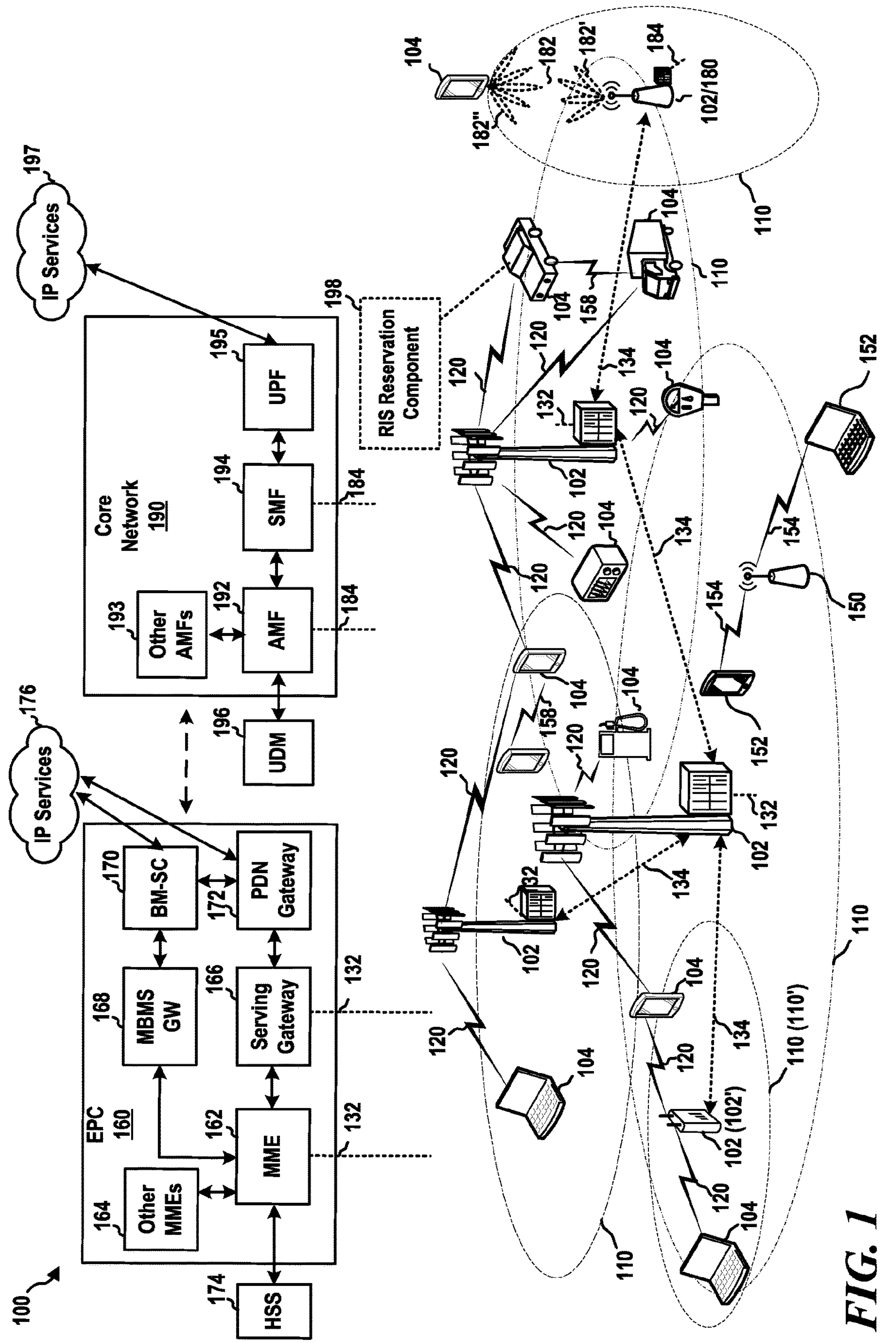
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Wireless communications systems may include or provide support for various types of communications, including device-to-device (D2D) communications over a D2D wireless link, such as a sidelink channel. The communications on a sidelink channel may be referred to as sidelink communications. Resources for sidelink communications may be selected by a sidelink user equipment (UE) from one or more groups of sidelink resources (for example, sidelink resource pools) or scheduled by a base station.

In some wireless networks, passive multiple-input and multiple-output (MIMO) antenna units may replace one or more active antenna units. A reconfigurable intelligent surface (RIS) is an example of a passive MIMO antenna unit. The RIS may be an electromagnetic material controlled by a wireless device, such as a base station, to extend coverage of a wireless network with little impact on total power consumption of a wireless system associated with the wireless network. In some examples, the RIS may be used to extend coverage of a sidelink UE. Additionally, or alternatively, the RIS may be used to prioritize communications between sidelink UEs. In some such examples, the RIS may be used to improve a quality of a communication link between two or more sidelink UEs. As the demands for sidelink communications increase, sidelink UEs may attempt to use a RIS to perform sidelink communications with other sidelink UEs. However, multiple UEs may not simultaneously access the same RIS due to a limited number of sidelink communication resources. Therefore, it may be desirable to provide a process for reserving a RIS for one of the UEs attempting to use the RIS to perform sidelink communications with other sidelink UEs.

Various aspects disclosed relate generally to reserving a RIS for sidelink communications. Some aspects more specifically relate to reserving a RIS for a sidelink UE, training the reserved RIS to use one or more beams, and using the reserved RIS to communicate with one or more sidelink UEs. In such aspects, the sidelink UE may receive a reservation confirmation message indicating an assignment (for example, reservation) of a RIS. In some examples, the reservation confirmation message may be received based on a reservation message, transmitted by the sidelink UE to the RIS or a base station, requesting reservation of the RIS. In some such examples, the reservation message is a reference signal transmitted on predefined resources. In other examples, the reservation confirmation message is received based on a service request transmitted to the base station. In some other examples, the reservation confirmation message is transmitted by the base station and is not associated with a reservation message requesting reservation of the RIS. The sidelink UE may also receive a communication window message indicating a period of time, such as a number of frames, associated with the assignment. The sidelink UE may then transmit a beam training sequence to the RIS for beam training the RIS to identify a beam index, of multiple beam indices, that satisfies one or more beam selection criteria. In some examples, the beam training sequence is a sequence of reference signals. The beam index may satisfy the beam selection criteria based on the beam index being associated with a highest spectral efficiency, a highest reference signal received power (RSRP), a highest reference signal received quality (RSRQ), or a lowest signal to interference and noise ratio (SINR). After training the reserved RIS, the sidelink UE may use the reserved RIS to communicate with another sidelink UE using a beam associated with the beam index selected during the training process.

Particular aspects of the subject matter described in this disclosure may be implemented to realize one or more of the following potential advantages. In some examples, the described techniques may provide a process for reserving a RIS for a sidelink UE, such that the RIS may be used to facilitate communications between the sidelink UE and another sidelink UE. In such examples, the RIS may extend coverage of the sidelink UE to facilitate communications with the other sidelink UE. Additionally, the described techniques may provide a process for training the RIS to identify a beam index, of multiple beam indices, that satisfies one or more beam selection criteria. In such examples, the RIS may improve a quality of a communication channel between the sidelink UE and another sidelink UE by using a beam associated with a beam index selected during the training process.

In cellular communications networks, wireless devices may generally communicate with each other via one or more network entities such as a base station or scheduling entity. As discussed above, some networks may support D2D communications that enable discovery of, and communications with nearby devices using a direct link between devices (for example, without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

D2D communications may be implemented using licensed or unlicensed bands. Additionally, D2D communications can avoid the overhead involving the routing to and from the base station. Therefore, D2D communications can improve throughput, reduce latency, and/or increase energy efficiency.

A type of D2D communications may include vehicle-to-everything (V2X) communications. V2X communications may assist autonomous vehicles in communicating with each other. For example, autonomous vehicles may include multiple sensors (for example, light detection and ranging (LiDAR), radar, cameras, etc.). In most cases, the autonomous vehicle's sensors are line of sight sensors. In contrast, V2X communications may allow autonomous vehicles to communicate with each other for non-line of sight situations.

As discussed above, sidelink communications refers to the communication between UEs without tunneling through a base station and/or a core network. Sidelink communications can be communicated over a physical sidelink control channel (PSCCH) and a physical sidelink shared channel (PSSCH). The PSCCH and PSSCH are similar to a physical downlink control channel (PDCCH) and a physical downlink shared channel (PDSCH) in downlink (DL) communications between a base station and a UE. For instance, the PSCCH may carry sidelink control information (SCI) and the PSCCH may carry sidelink data (for example, user data). Each PSCCH is associated with a corresponding PSSCH, where SCI in a PSCCH may carry reservation and/or scheduling information for sidelink data transmission in the associated PSSCH. Use cases for sidelink communications may include, among others, V2X, industrial Internet of things (IIoT), and/or new radio (NR)-lite.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (for example, a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (for example, S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over backhaul links 134 (for example, X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (for example, 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (for example, macro base station), may include an eNB, gNodeB (gNB), or another type of base station. Some base stations, such as gNB 180 may operate in a traditional sub 6 GHz spectrum, in millimeter wave (mmWave) frequencies, and/or near mm Wave frequencies in communication with the UE 104. When the gNB 180 operates in mmWave or near mm Wave frequencies, the gNB 180 may be referred to as an mmWave base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mmWave/near mm Wave radio frequency band (for example, 3 GHz-300 GHz) has extremely high path loss and a short range. The mm Wave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions.

The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit and receive point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as Internet of things (IoT) devices (for example, a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a receiving device, such as the UE 104, may receive sensing information from one or more other UEs 104. The UE 104 that received the sensing information may also obtain sensing information from its own measurements. The UE 104 may include a RIS reservation component 198 configured to receive a reservation confirmation message indicating an assignment of a RIS to the first SL UE; receive a communication window message indicating a period of time associated with the assignment; transmit, within the period of time, a beam training sequence for beam training the RIS to identify a beam index, of multiple beam indices, that satisfies one or more beam selection criteria; and transmit, within the period of time via a beam associated with the beam index, data intended for transmission to a second SL UE via the RIS.

Although the following description may be focused on 5G NR, it may be applicable to other similar areas, such as LTE, LTE-A, CDMA, GSM, and other wireless technologies.

Figure 2A:
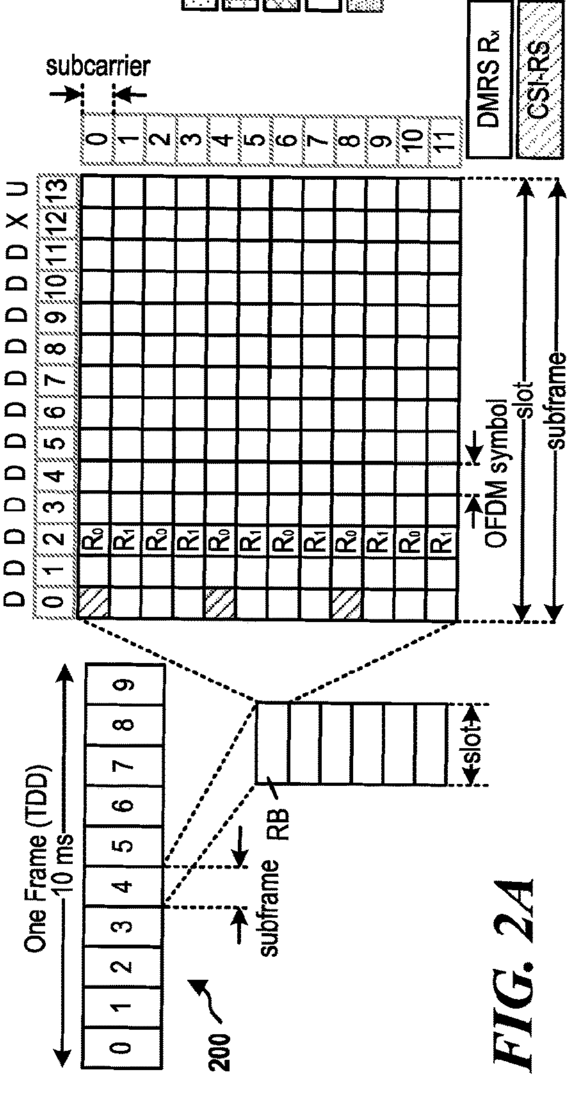
FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.
Figure 2B:
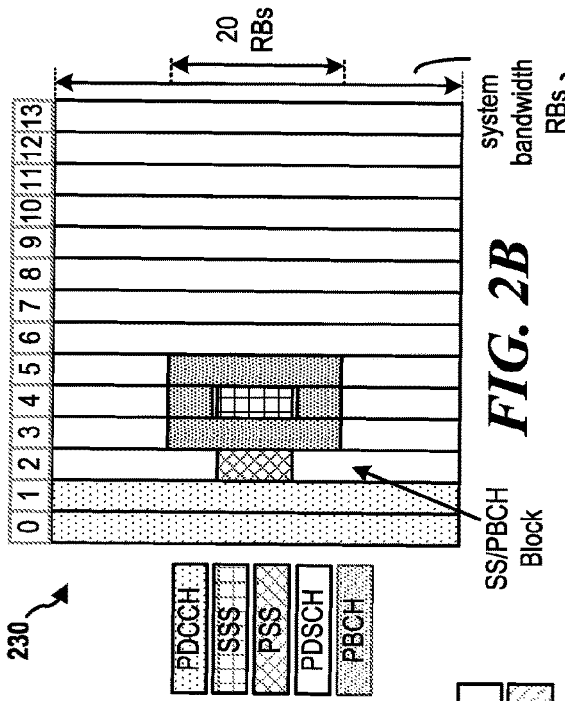
Figure 2C:
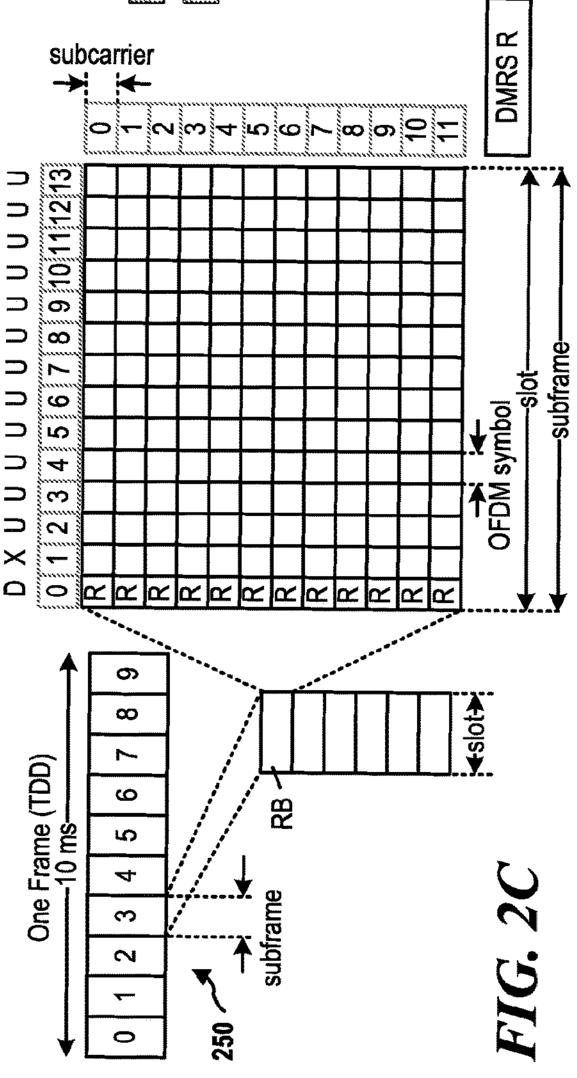
Figure 2D:
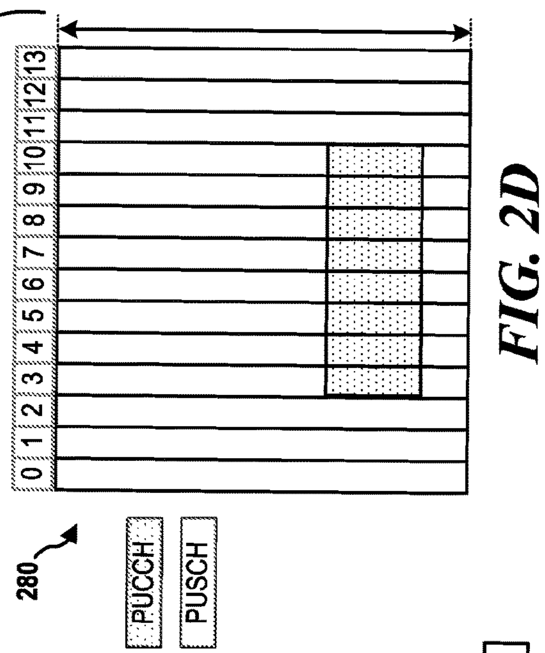

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu*15$ kHz, where u is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DMRS) (indicated as Rx for one particular configuration, where 100x is the port number, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment/negative acknowledgment (ACK/NACK) feedback. The PUSCH carries data, and may additionally be used to carry a buffer status report (BSR), a power headroom report (PHR), and/or UCI.

Figure 3:
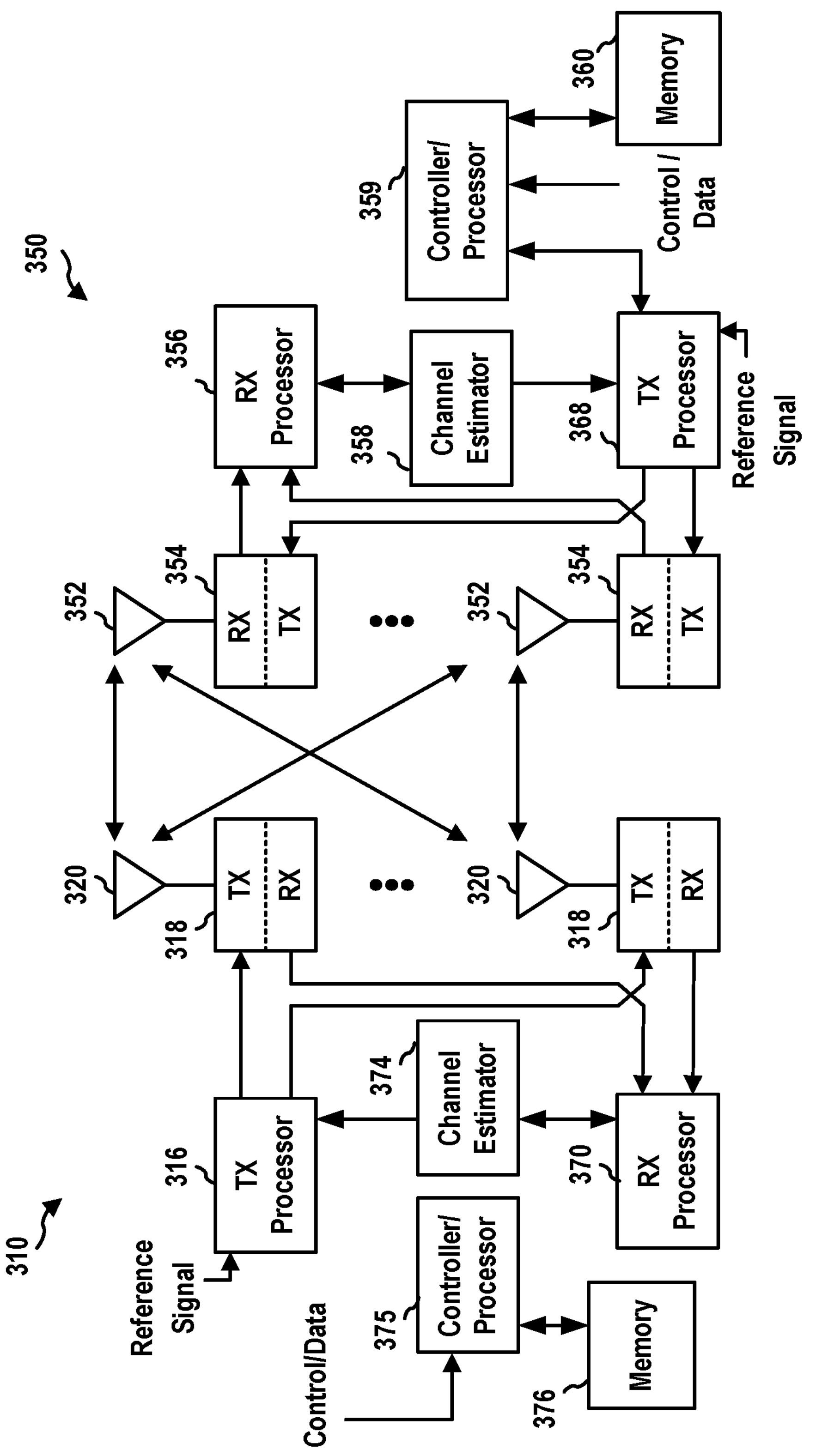
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (for example, MIB, SIBs), RRC connection control (for example, RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (for example, binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (for example, pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the RIS reservation component 198 of FIG. 1. Additionally, at least one of the TX processor 316, the RX processor 370, and the controller/processor 375 may be configured to perform aspects in connection with RIS reservation component 198.

Figure 4:
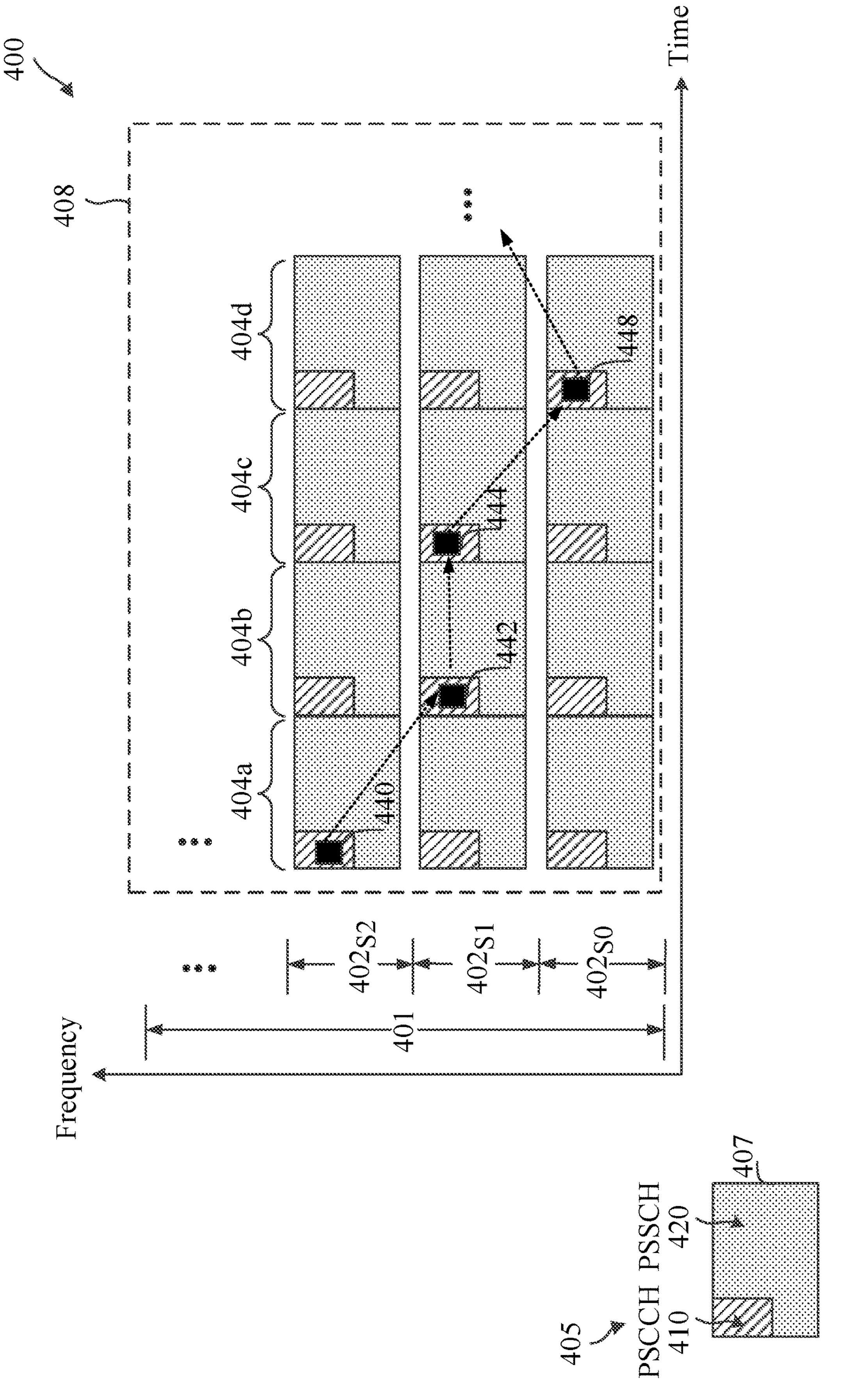
FIG. 4 is a block diagram illustrating a sidelink (SL) communications scheme, in accordance with various aspects of the present disclosure.

FIG. 4 is a graph illustrating a sidelink (SL) communications scheme, in accordance with various aspects of the present disclosure. A scheme 400 may be employed by UEs such as the UEs 104 in a network such as the network 100. In FIG. 4, the x-axis represents time and the y-axis represents frequency. The CV2X channels may be for 3GPP Release 14 and beyond.

In the scheme 400, a shared radio frequency band 401 is partitioned into multiple subchannels or frequency subbands 402 (shown as $\mathbf{402}_{S0}$, $\mathbf{402}_{S1}$, 402S2) in frequency and multiple sidelink frames 404 (shown as 404*a*, 404*b*, 404*c*, 404*d*) in time for sidelink communications. The frequency band 401 may be at any suitable frequencies. The frequency band 401 may have any suitable bandwidth (BW) and may be partitioned into any suitable number of frequency subbands 402. The number of frequency subbands 402 can be dependent on the sidelink communications BW requirement.

Each sidelink frame 404 includes a sidelink resource 407 in each frequency subband 402. A legend 405 indicates the types of sidelink channels within a sidelink resource 407. In some instances, a frequency gap or guard band may be specified between adjacent frequency subbands 402, for example, to mitigate adjacent band interference. The sidelink resource 407 may have a substantially similar structure as an NR sidelink resource. For instance, the sidelink resource 407 may include a number of subcarriers or RBs in frequency and a number of symbols in time. In some instances, the sidelink resource 407 may have a duration between about one millisecond (ms) to about 20 ms. Each sidelink resource 407 may include a PSCCH 410 and a PSSCH 420. The PSCCH 410 and the PSSCH 420 can be multiplexed in time and/or frequency. The PSCCH 410 may be for part one of a control channel (CCH), with the second part arriving as a part of the shared channel allocation. In the example of FIG. 4, for each sidelink resource 407, the PSCCH 410 is located during the beginning symbol(s) of the sidelink resource 407 and occupies a portion of a corresponding frequency subband 402, and the PSSCH 420 occupies the remaining time-frequency resources in the sidelink resource 407. In some instances, a sidelink resource 407 may also include a physical sidelink feedback channel (PSFCH), for example, located during the ending symbol(s) of the sidelink resource 407. In general, a PSCCH 410, a PSSCH 420, and/or a PSFCH may be multiplexed within a sidelink resource 407.

The PSCCH 410 may carry SCI 440 and/or sidelink data. The sidelink data can be of various forms and types depending on the sidelink application. For instance, when the sidelink application is a V2X application, the sidelink data may carry V2X data (for example, vehicle location information, traveling speed and/or direction, vehicle sensing measurements, etc.). Alternatively, when the sidelink application is an IIoT application, the sidelink data may carry IIoT data (for example, sensor measurements, device measurements, temperature readings, etc.). The PSFCH can be used for carrying feedback information, for example, HARQ ACK/NACK for sidelink data received in an earlier sidelink resource 407.

In an NR sidelink frame structure, the sidelink frames 404 in a resource pool 408 may be contiguous in time. A sidelink UE (for example, the UEs 104) may include, in SCI 440, a reservation for a sidelink resource 407 in a later sidelink frame 404. Thus, another sidelink UE (for example, a UE in the same NR-U sidelink system) may perform SCI sensing in the resource pool 408 to determine whether a sidelink resource 407 is available or occupied. For instance, if the sidelink UE detected SCI indicating a reservation for a sidelink resource 407, the sidelink UE may refrain from transmitting in the reserved sidelink resource 407. If the sidelink UE determines that there is no reservation detected for a sidelink resource 407, the sidelink UE may transmit in the sidelink resource 407. As such, SCI sensing can assist a UE in identifying a target frequency subband 402 to reserve for sidelink communications and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 402 in one sidelink frame 404 to another frequency subband 402 in another sidelink frame 404. In the illustrated example of FIG. 4, during the sidelink frame 404*a*, the sidelink UE transmits SCI 440 in the sidelink resource 407 located in the frequency subband $\mathbf{402}_{S2}$ to reserve a sidelink resource 407 in a next sidelink frame 404*b* located at the frequency subband $\mathbf{402}_{S1}$. Similarly, during the sidelink frame 404*b*, the sidelink UE transmits SCI 442 in the sidelink resource 407 located in the frequency subband $\mathbf{402}_{S1}$ to reserve a sidelink resource 407 in a next sidelink frame 404*c* located at the frequency subband 402S1. During the sidelink frame 404*c*, the sidelink UE transmits SCI 444 in the sidelink resource 407 located in the frequency subband $\mathbf{402}_{S1}$ to reserve a sidelink resource 407 in a next sidelink frame 404*d* located at the frequency subband $\mathbf{402}_{S0}$. During the sidelink frame 404*d*, the sidelink UE transmits SCI 448 in the sidelink resource 407 located in the frequency subband $\mathbf{402}_{S0}$. The SCI 448 may reserve a sidelink resource 407 in a later sidelink frame 404.

The SCI can also indicate scheduling information and/or a destination identifier (ID) identifying a target receiving sidelink UE for the next sidelink resource 407. Thus, a sidelink UE may monitor SCI transmitted by other sidelink UEs. Upon detecting SCI in a sidelink resource 407, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 404 in different frequency subband (for example, via frequency division multiplexing (FDM)). For instance, in the sidelink frame 404*b*, one pair of sidelink UEs may communicate sidelink data using a sidelink resource 407 in the frequency subband 402S2 while another pair of sidelink UEs may communicate sidelink data using a sidelink resource 407 in the frequency subband 402S1.

In some aspects, the scheme 400 is used for synchronous sidelink communications. That is, the sidelink UEs may be synchronized in time and are aligned in terms of symbol boundary, sidelink resource boundary (for example, the starting time of sidelink frames 404). The sidelink UEs may perform synchronization in a variety of forms, for example, based on sidelink synchronization signal blocks (SSBs) received from a sidelink UE and/or NR-U SSBs received from a base station (for example, the base stations 102 and/or 310) while in-coverage of the base station. In some aspects, the sidelink UE may be preconfigured with the resource pool 408 in the frequency band 401, for example, while in coverage of a serving base station. The resource pool 408 may include a plurality of sidelink resources 407. The base station can configure the sidelink UE with a resource pool configuration indicating resources in the frequency band 401 and/or the subbands 402 and/or timing information associated with the sidelink frames 404. In some aspects, the scheme 400 includes mode-2 RRA (for example, supporting autonomous radio resource allocation (RRA) that can be used for out-of-coverage sidelink UEs or partial-coverage sidelink UEs).

In some examples, one bandwidth part (BWP) may include multiple receiving and transmitting resource pools. In such examples, physical layer channels may be configured per resource pool. Resources from the one or more resource pools may be allocated based on one of two resource allocation modes. A base station scheduled mode, which may be referred to as Mode 1, is one of the two resource allocation modes. The other of the two modes, which is referred to as Mode 2, is a UE autonomous selection mode. In Mode 1, the UE may send a service request to the serving base station. The base station may then approve the service request and assign time-frequency resources for the sidelink communication. In Mode 2, the base station transmits a resource pool to one or more UEs. The resource pool may be a list of time-frequency resources that are available for use for sidelink communications. The base station may transmit the resource pool to a UE (for example, using a random access channel (RACH) or dedicated signaling). In Mode 2, after receiving the resource pool from the base station, the UE may select a time-frequency resource from the resource pool to use for the sidelink communications. The time-frequency resources may be selected based on a channel sensing function. The channel sensing function may determine a reference signal received power (RSRP) for a resource and a priority of a transmission on a resource. For an in-coverage UE, a base station may be configured to use Mode 1 or Mode 2. In contrast, an out-of-coverage UE may only use Mode 2.

In some wireless networks, massive MIMO may be implemented to extend network coverage and also increase network throughput. In some examples, massive MIMO may use multiple active antenna units (AAUs) (for example, base stations) to extend network coverage and also increase network throughput (for example, improve beamforming gains). In some such examples, two UEs may be within range of a first AAU. However, the signal from the first AAU may not reach one of the two UEs due to a blockage, such as a building blocking the signal. In such examples, a second AAU may be deployed to extend network coverage to the UE that failed to receive the signal from the first AAU. Although multiple AAUs may increase network coverage, multiple AAUs may also increase a total power consumption of a wireless system associated with the wireless network.

Figure 5A:
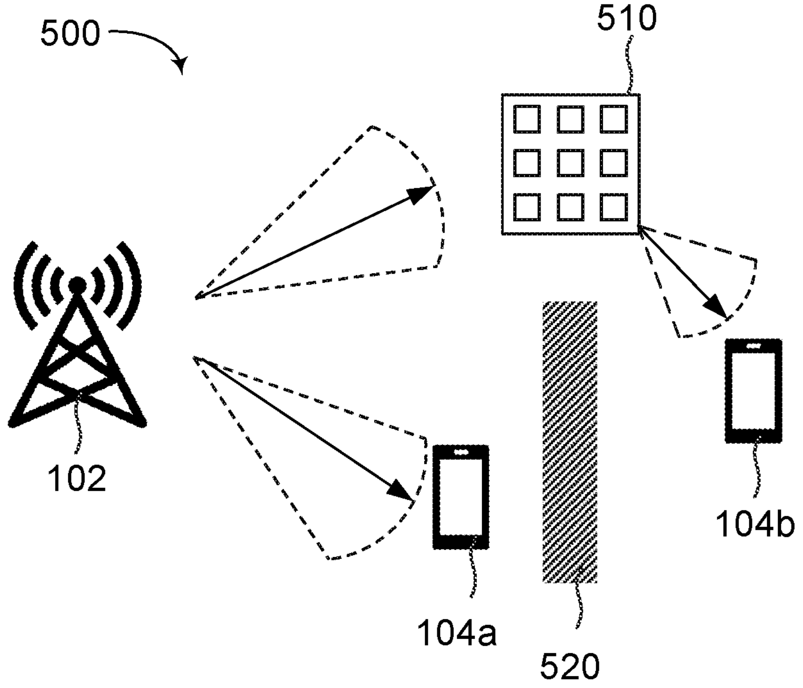
FIG. 5A is a block diagram illustrating a wireless communication network employing a reconfigurable intelligent surface (RIS) to extend network coverage, in accordance with various aspects of the present disclosure.

It may be desirable to decrease power consumption while also extending network coverage. In some examples, one or more RISs may be deployed in a wireless network to extend coverage of the wireless network with a minimum impact on a total power consumption of a wireless system associated with the wireless network. FIG. 5A is a block diagram illustrating a wireless communication network 500 employing a RIS 510 to extend network coverage. As shown in the example of FIG. 5A, the wireless communication network 500 also includes a base station 102 and two UEs 104*a* and 104*b*. In the example of FIG. 5A, an environmental feature 520, such as a building, a mountain, or another type of natural or manmade object, may block a signal from the base station 102 to the second UE 104*b*. In some examples, the second UE 104*b* may fail to receive the signal from the base station 102 due to the blockage. In contrast, the first UE 104*a* may directly receive a signal from the base station 102. In some other examples, a quality of the signal received at the second UE 104*b* from the base station 102 may be less than a signal quality threshold due to the blockage by the environmental feature 520. In contrast to conventional systems that may deploy another assisting node to extend coverage to the second UE 104*b*, the example of FIG. 5A uses the RIS 510 to reflect the signal from the base station 102 around the environmental feature 520 (for example, around the blockage) to the second UE 104*b*. In such an example, the RIS 510 may extend network coverage of the wireless communication network 500 from the base station 102 to the second UE 104*b*.

In some examples, the RIS 510 may be controlled to reflect an impinging signal to a desired direction, such as toward the second UE 104*b*. In some such examples, the base station 102 may control the RIS 510. Additionally, or alternatively, the base station 102 may control the RIS 510 to adjust one or more characteristics of an impinging signal. These characteristics may include, for example, a phase, an amplitude, a frequency, or polarization of a signal transmitted by the base station 102 or the UEs 104*a* and 104*b*.

In some examples, the base station 102 is aware of a fixed direction of signal reception from the RIS 510, and the RIS 510 is aware of a direction of a reflected beam to the base station 102 because the base station 102 is fixed. However, a direction of an incoming signal (for example, uplink signal from the second UE 104*b*) to the RIS 510 is not fixed because the second UE 104*b* is mobile and the direction of the uplink beam depends on a location of a second UE 104*b*. Therefore, the RIS 510 may be trained to use one or more beams from a group of beams for uplink signals from the second UE 104*b* to the base station 102. In such examples, a beam training procedure may be specified to identify a reliable link between the base station 102 and the second UE 104*b*. In such examples, the second UE 104*b* may transmit a sequence of training reference signals to the base station 102 via the RIS 510 during a communication window. The RIS 510 may use a different non-codebook precoder for each reference signal in the sequence of training reference signals. The second UE 104*b* may use different beams for the reference signal transmissions. The RIS 510 (for example, a RIS controller) may select the beam that satisfies a receiver metric condition, such as a highest channel rank, highest spectral efficiency, highest RSRP, highest reference signal received quality (RSRQ), or lowest signal to interference and noise ratio (SINR).

Figure 5B:
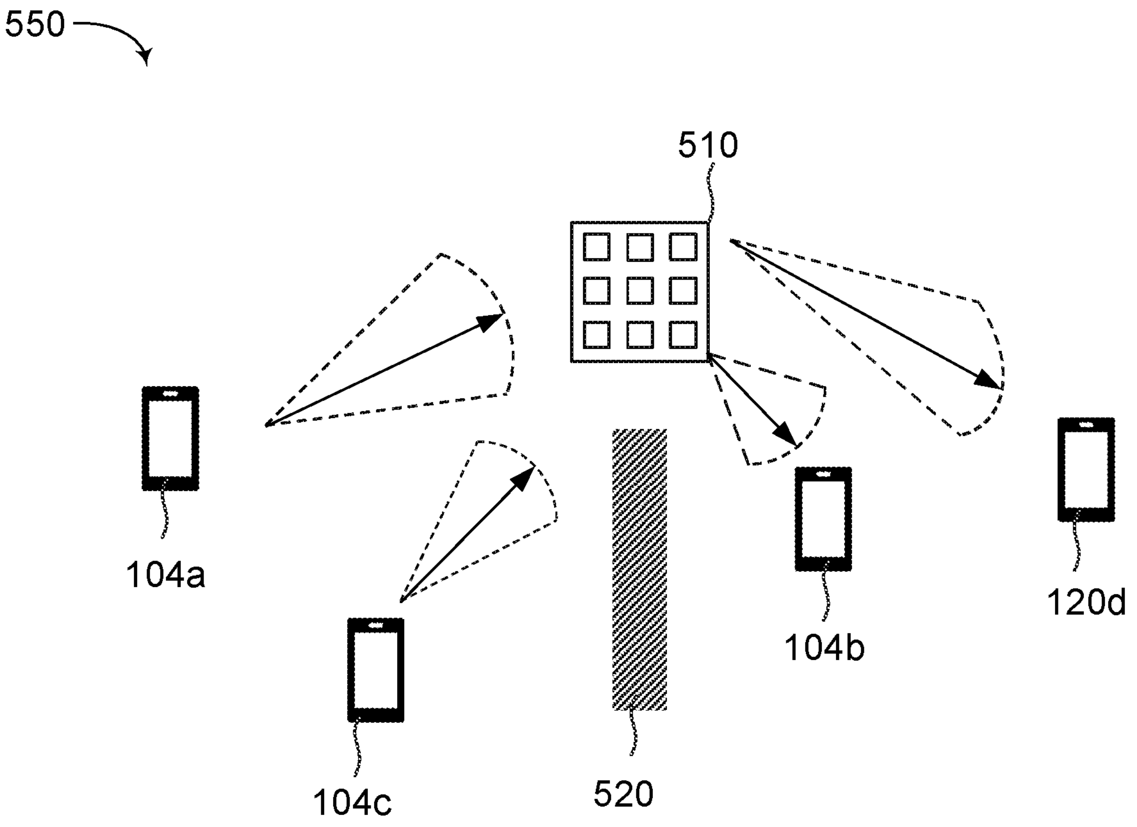
FIGS. 5B and 5C are block diagrams illustrating examples of multiple sidelink UEs using a RIS to communicate with other sidelink UEs, in accordance with various aspects of the present disclosure.

In some examples, multiple sidelink UEs may attempt to use one or more RISs to communicate with one or more sidelink UEs. An example of multiple sidelink UEs attempting to use one or more RISs to communicate with one or more sidelink UEs is shown in FIG. 5B, which is a block diagram illustrating an example of multiple sidelink UEs 104*a* and 104*c* using a RIS 510 to communicate with other sidelink UEs 104*b* and 104*d*. As shown in the example of FIG. 5B, a wireless communication network 550 may include multiple sidelink UEs 104*a*, 104*b*, 104*c*, and 104*d*. Due to the presence of an environmental feature 520, a first sidelink UE 104*a* may use the RIS 510 to communicate with a second sidelink UE 104*b*, and a third sidelink UE 104*c* may use the RIS 510 to communicate with a fourth sidelink UE 104*d*. In such examples, the sidelink UEs 104*a* and 104*c* may reserve the RIS 510 for communications with the respective sidelink UEs 104*b* and 104*d*. In some examples, one sidelink UE 104*a* or 104*c* may reserve all communications resources (for example, resource blocks) within a period of time to communicate with the RIS 510. In some other examples, the communication resources for communicating with the RIS 510 may be divided into two or more groups of communication resources. Each group of communication resources may be assigned a priority. In such examples, each UE 104*a* and 104*c* may be assigned to use a group of communication resources based on a priority of the UE 104*a* and 104*c*, a quality of service (QoS) requirement, or a signal metric (for example, RSRP).

Figure 5C:
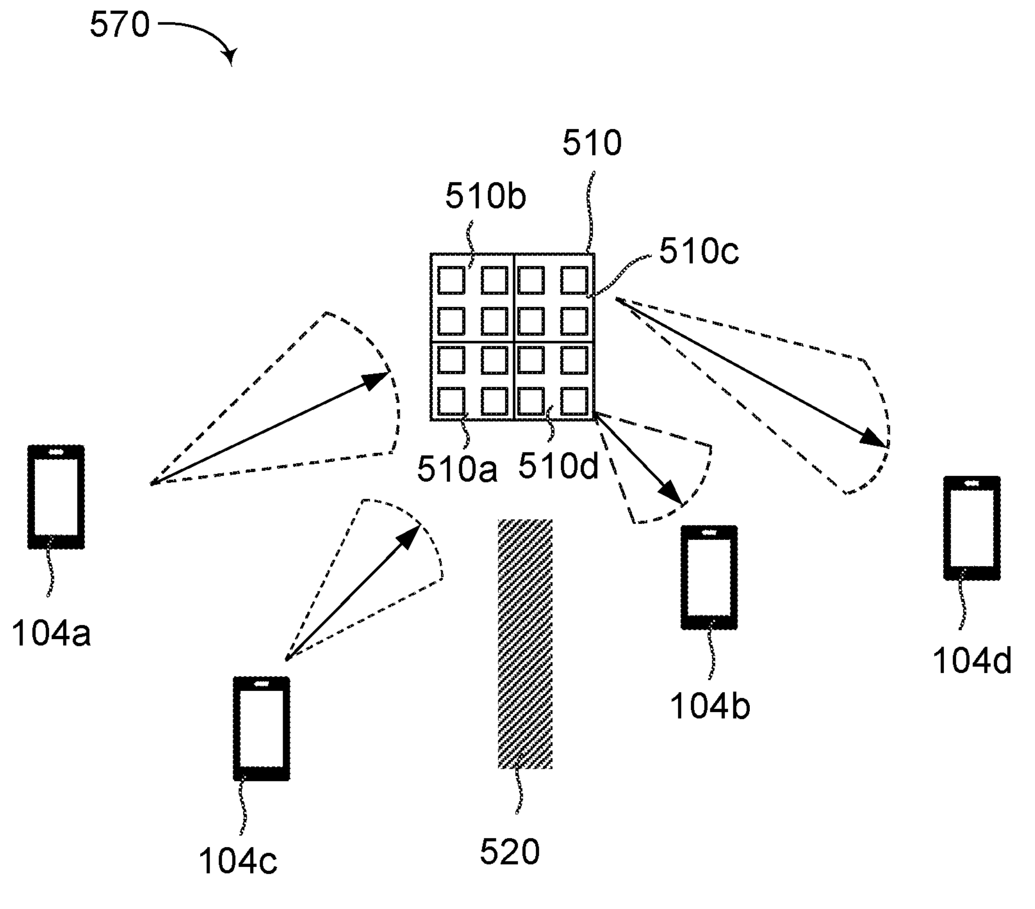

In some examples, a RIS may be divided into two or more clusters. Each cluster may be referred to as a subRIS. FIG. 5C is a block diagram illustrating an example of multiple sidelink UEs 104*a* and 104*c* using a RIS 510 to communicate with other sidelink UEs 104*b* and 104*d*. As shown in the example of FIG. 5C, a wireless communication network 570 may include multiple sidelink UEs 104*a*, 104*b*, 104*c*, and 104*d*. Due to the presence of an environmental feature 520, a first sidelink UE 104*a* may use the RIS 510 to communicate with a second sidelink UE 104*b*, and a third sidelink UE 104*c* may use the RIS 510 to communicate with a fourth sidelink UE 104*d*. In the example of FIG. 5C, the RIS 510 may be divided into subRISs 510*a*, 510*b*, 510*c*, and 510*d*. In some examples, each sidelink UE 104*a* and 104*c* may reserve one or more subRISs 510*a*, 510*b*, 510*c*, and 510*d* to communicate with another sidelink UE 104*b* or 104*c*. Each subRIS 510*a*, 510*b*, 510*c*, and 510*d* may be considered a separate RIS. In such examples, a RIS controller (not shown) may be assigned one or more subRIS 510*a*, 510*b*, 510*c*, and 510*d* to each UE 104*a* and 104*c*. Each subRIS 510*a*, 510*b*, 510*c*, and 510*d* is associated with a different physical area of the RIS 510. In the example of FIG. 5C, the RIS controller may receive a first reservation request from the first sidelink UE 104*a* and a second reservation request from a third sidelink UE 104*c*. The RIS controller may assign one or more subRISs 510*a*, 510*b*, 510*c*, and 510*d* to the first sidelink UE 104*a* and one or more subRISs 510*a*, 510*b*, 510*c*, and 510*d* to the second sidelink UE 104*b*. As an example, a first subRIS 510*a* and a second subRIS 510*b* may be assigned to the first sidelink UE 104*a*, and a third subRIS 510*c* and a fourth subRIS 510*d* may be assigned to the second sidelink UE 104*b*. In some examples, different predefined resources, such as time and frequency resources, may be associated with each subRIS 510*a*, 510*b*, 510*c*, and 510*d*. In such examples, a sidelink UE 104*a* or 104*c* may transmit a reservation request using one or more of the predefined resources based on a number of subRISs desired by the sidelink UE 104*a* or 104*c* or based on a priority or QoS requirement of transmission by the sidelink UE 104*a* or 104*c*. In other examples, predefined resources may be used to reserve the RIS 510. In such examples, the RIS controller or base station (not shown in FIG. 5C) may then assign the one or more subRISs 510*a*, 510*b*, 510*c*, and 510*d* to the UE 104*a* or 104*c* based on one or more of UE priority, QoS requirements, subRIS availability, or a number of subRISs requested by the UE 104*a* or 104*c*.

In various aspects of the present disclosure, after reserving a RIS, a UE may train the RIS using a sequence of training reference signals. The UE may then use the trained RIS to communicate with other UEs, such as other sidelink UEs. Aspects of the present disclosure describe a sidelink UE reserving a RIS. The various aspects of the present disclosure are not limited to sidelink UEs. Other types of wireless communication devices, such as IoT devices, vehicles, or wearable devices, may reserve a RIS for sidelink communications with other sidelink devices.

Figure 6A:
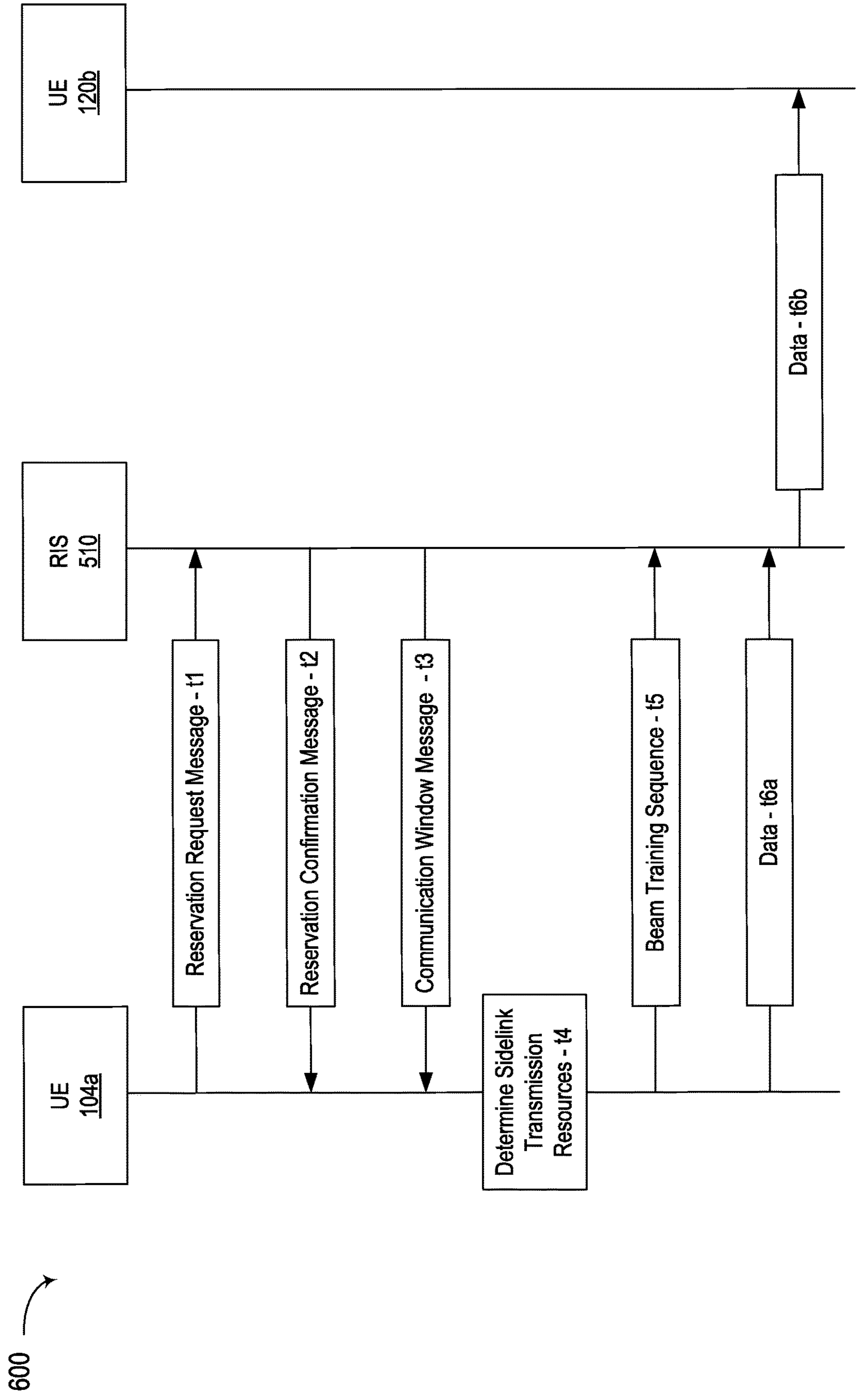
FIGS. 6A and 6B are timing diagrams illustrating examples for reserving a RIS, in accordance with various aspects of the present disclosure.

As described, in some examples, a sidelink UE may reserve a RIS based on a reservation request transmitted on predefined resources, such as time and frequency resources. FIG. 6A is a timing diagram illustrating an example 600 for reserving a RIS 510, in accordance with various aspects of the present disclosure. As shown in FIG. 6A, at time t1, the UE 104*a* may transmit a reservation request message to the RIS 510. In the example of FIG. 6A, the UEs 104*a* and 104*b* may be sidelink UEs and may communicate with each other and the RIS 510 via a sidelink channel. In some examples, the reservation request message may be a reference signal that is transmitted on a predefined group of resources, such as predefined time and frequency resources, on a sidelink channel. The time and frequency resources may be frequency subbands 402 and sidelink frames 404 as described with reference to FIG. 4. The reference signal may be a sequence based reference signal. In some examples, a RIS controller integrated with the RIS 510 may monitor for the reservation message (for example, the reference signal) on the predefined resource. In some examples, two or more groups of resources may be defined for reservation requests. Each group of resources may be associated with a different priority. In some such examples, a first group of resources may be associated with a high priority and a second group of resources may be associated with a low priority. In such examples, the UE 104*a* may select a group of resources based on a priority of a transmission, QoS requirements, or link quality (for example, a filtered RSRP). In some examples, the UE 104*a* may use a group of resources associated with a high priority if the UE 104*a* has a high priority transmission. In other examples, the UE 104*a* may use a group of resources associated with a high priority if the RSRP measured at a receiving UE 104*b* via a direct link with the UE 104*a* satisfies channel state information (CSI) criteria. In one such example, the CSI criteria is satisfied if the RSRP is below a threshold. In other examples, the UE 104*a* may use a group of resources associated with a low priority if the UE 104*a* has a high priority transmission. In some other examples, the UE 104*b* may use the group of resources associated with the low priority if the RSRP measured at a receiving UE 104*b* via a direct link with the UE 104*a* does not satisfy CSI criteria (for example, the RSRP is greater than a threshold).

As shown in FIG. 6A, at time t2, the RIS 510 may transmit a reservation confirmation message to the UE 104*a* based on receiving the reservation request message at time t1. The reservation confirmation message may indicate an assignment (for example, reservation) of the RIS 510 to the UE 104*a*. Additionally, at time t3, the RIS 510 may transmit a communication window message indicating a period of time associated with the assignment. The communication window message and the reservation confirmation message may be transmitted within a same message, or as different messages (as shown in FIG. 6A). The period of time may be a number of sidelink frames, such as the sidelink frames 404 described with reference to FIG. 4. In other examples, the period of time may be slots, transmission occasions, time units, or other communication resources. In some examples, the communication window message may be transmitted by a base station (not shown in FIG. 6A). In such examples, the base station may determine the period of time per resource pool. The communication window message may be indicated via RRC signaling, a MAC-CE message, or DCI signaling to one or both of the UE 104*a* or the RIS 510. In some examples, the communication window message may be relayed to an out-of-coverage UE. In some other examples, a controller associated with the RIS 510 may not receive over-the-air transmissions. In such examples, the communication window message may indicate training occasions and data transmission occasions within the period of time.

The UE 104*a* may determine sidelink transmission resources, at time t4, after receiving the reservation confirmation message, at time t2, and the communication window message, at time t3. In some examples, when the UE 104*a* is operating in Mode 1, the sidelink communication resources may be scheduled by the base station (not shown in FIG. 6A). In other examples, when the UE 104*a* is operating in Mode 2, the UE selects sidelink resources from one or more sidelink resource pools based on a channel sensing function. Aspects of the present disclosure are not limited to determining the sidelink transmission resources at time t4. The sidelink transmission resources may be determined prior to either times t3 or t2.

In the example 600 of FIG. 6A, at time t5, the UE 104*a* may train the RIS 510 via a sequence of training reference signals. The training may be specified to identify a beam (for example, beam index) from multiple beams to serve the UE 104*a* to communicate with one or more other UEs 104*b*. The identified beam may satisfy a receiver metric condition. The sequence of training reference signals may be transmitted on one or more resources determined at time t4 within a time period specified in the communication window message. At time toa the UE 104*a* transmits data, such as PSSCH transmissions, to the RIS 510 on one or more resources determined at time t4 within a time period specified in the communication window message. The data is intended for another UE 104*b*. Therefore, at time t5*b*, the RIS 510 may forward the data to the other UE 104*b* on a sidelink channel.

Figure 6B:
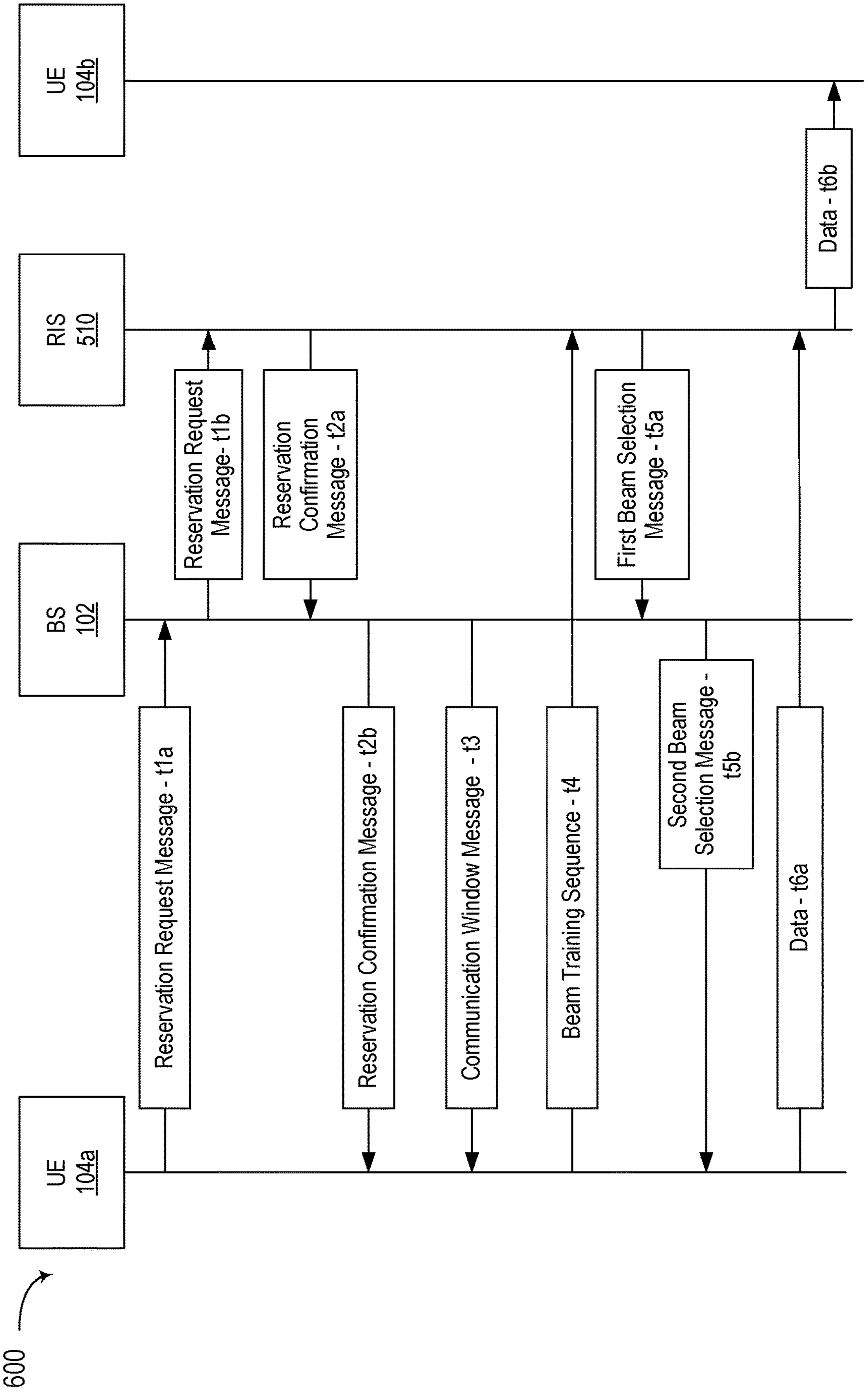

As discussed, in some examples, a controller associated with the RIS 510 may be incapable of performing over-the-air transmission. In such examples, the controller associated with the RIS 510 may communicate with a base station via a wired connection. In such examples, the RIS 510 may still reflect communications from one wireless node to another wireless node, such as a sidelink UE. In some other examples, the base station may facilitate reservation of the RIS even when the RIS is capable of over-the-air transmission. FIG. 6B is a timing diagram illustrating an example 650 for reserving a RIS 510, in accordance with various aspects of the present disclosure. As shown in FIG. 6B, at time t1*a*, the UE 104*a* may transmit a reservation request message to the base station 102. In the example of FIG. 6B, the UEs 104*a* and 104*b* may be sidelink UEs and may communicate with each other and the base station 102 via a sidelink channel. The RIS 510 may forward transmissions to one of the UEs 104*a* and 104*b*. In some examples, rather than transmitting a reservation request message, the UE 104*a* may transmit a service request. In such examples, the service request may indicate whether a RIS 510 should be used to communicate with another UE 104*b* based on CSI measurements of a channel between the UE 104*a* and the other UE 104*b*. The CSI measurements may be based on synchronization signal block (SSB) measurements with and without the RIS 510 or RSRP measurements. In some such examples, the controller associated with the RIS 510 may be capable of over-the-air transmission. In some other examples, the base station 102 may assign one or more RISs 510 to a UE 104*a* without receiving a request from the UE 104*a*. In such examples, the UE 104*a* may operate in Mode 1 and the base station assigns the RIS 510 to assist with PSSCH transmissions. In some such examples, the controller associated with the RIS 510 may be capable of over-the-air transmission.

As shown in FIG. 6B, at time t1*b*, the base station 102 may indicate the reservation request to the RIS 510. In some examples, at time t2*a*, the RIS 510 transmits a reservation confirmation message, to the base station 102, to confirm the reservation request. The base station 102 may forward the reservation confirmation message to the UE 104*a* at time t2*b*. In other examples, when the base station 102 assigns the RIS 510 without receiving a reservation request, the base station 102 may indicate the assignment to the RIS 510. At time t3, the base station 102 may transmit a communication window message indicating a period of time associated with the assignment. The communication window message and the reservation confirmation message may be transmitted within a same message, or as different messages (as shown in FIG. 6B). The period of time may be a number of sidelink frames, such as the sidelink frames 404 described with reference to FIG. 4. In other examples, the period of time may be slots, transmission occasions, time units, or other communication resources. In some examples, the communication window message may be transmitted by the RIS 510 (not shown in FIG. 6B). In some examples, the base station 102 may determine the period of time per resource pool. The communication window message may be indicated via RRC signaling, a MAC-CE message, or DCI signaling to one or both of the UE 104*a* or the RIS 510. In some examples, the communication window message may be relayed to an out-of-coverage UE. In some examples, when the controller associated with the RIS 510 is incapable of receiving over-the-air transmissions, the communication window message may indicate training occasions and data transmission occasions within the period of time.

In some examples, the UE 104*a* may determine sidelink transmission resources (not shown in FIG. 6B) after receiving the reservation confirmation message, at time t2*b*, and the communication window message, at time t3. In some examples, when the UE 104*a* is operating in Mode 1, the sidelink communication resources may be scheduled by the base station 102. In other examples, when the UE 104*a* is operating in Mode 2, the UE selects sidelink resources from one or more sidelink resource pools based on a channel sensing function. Aspects of the present disclosure are not limited to determining the sidelink transmission resources after time t3. The sidelink transmission resources may be determined prior to either time t3 or t2*b*.

In the example 600 of FIG. 6B, at time t4, the UE 104*a* may train the RIS 510 via a sequence of training reference signals. The training may be specified to identify a beam (for example, beam index) from multiple beams to serve the UE 104*a* to communicate with one or more other UEs 104*b*. The identified beam may be associated with a highest receiver metric. The sequence of training reference signals may be transmitted to the base station 102 on one or more resources of a resource pool within a time period specified in the communication window message. At time t5*a*, the RIS 510 may transmit to the base station 102, a first beam selection message indicating a beam index, of multiple beam indices, that satisfies one or more beam selection criteria. At time t5*b*, the base station may transmit, to the UE 104*a*, a second beam selection message indicating the beam index. At time toa the UE 104*a* transmits data, such as PSSCH transmissions, to the RIS 510 on one or more resources of the resource pool within a time period specified in the communication window message. The data is intended for another UE 104*b*. Therefore, the RIS 510 may forward the data to the other UE 104*b* on a sidelink channel at time t6*b*.

Figure 7:
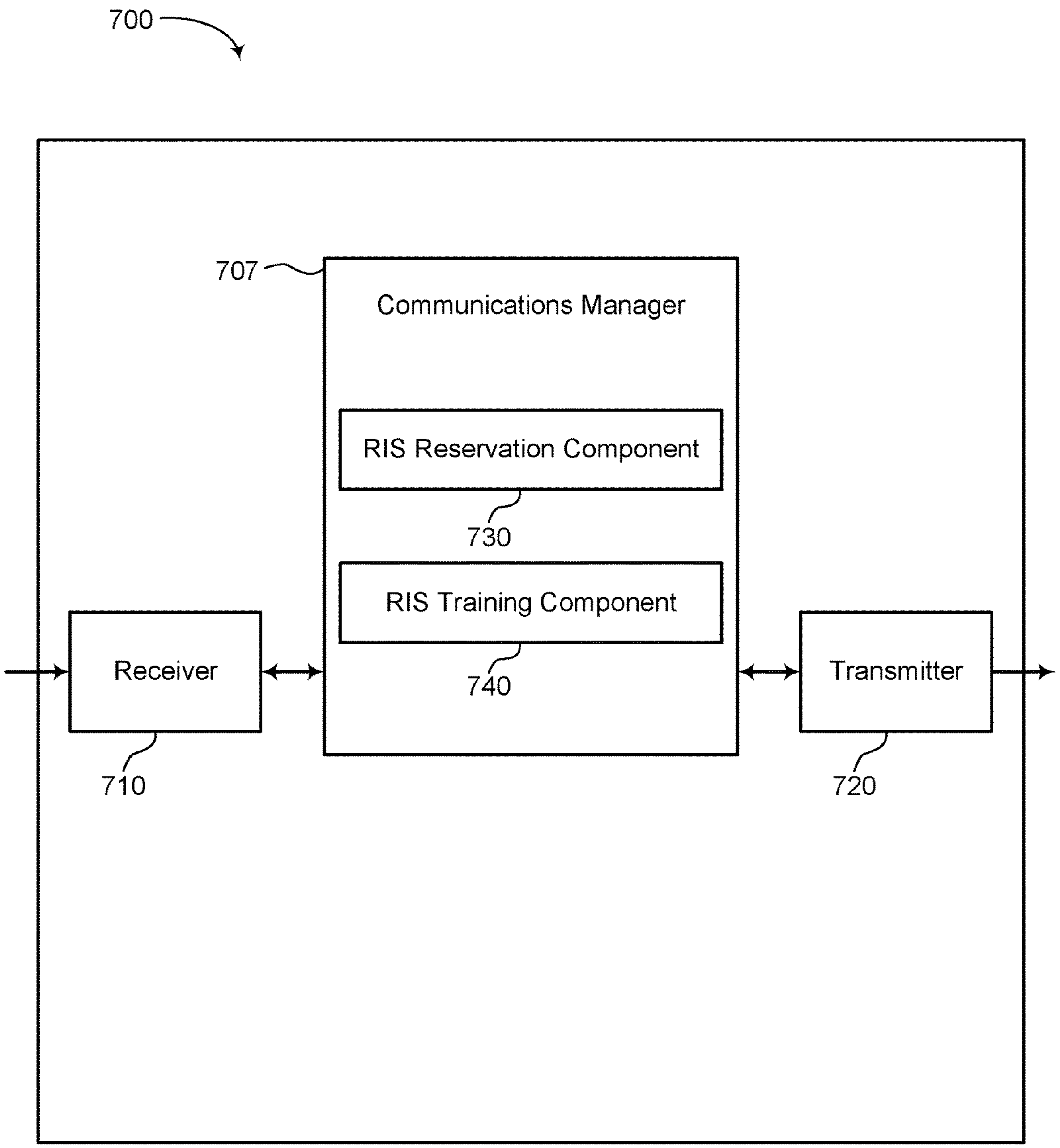
FIG. 7 is a block diagram illustrating an example wireless communication device that supports reserving a RIS, in accordance with some aspects of the present disclosure.

FIG. 7 is a block diagram illustrating an example wireless communication device that supports adopting a pre-configured parameter set based on a current connection mode, in accordance with some aspects of the present disclosure. The device 700 may be an example of aspects of a UE 104 described with reference to FIGS. 1, 5A, 5B, 5C, 6A, and 6B. The wireless communications device 700 may include a receiver 710, a communications manager 707, a transmitter 720, a RIS reservation component 730, and a RIS training component 740, which may be in communication with one another (for example, via one or more buses). In some examples, the wireless communications device 700 is configured to perform operations, including operations of the processes 800 described below with reference to FIG. 8.

In some examples, the wireless communications device 700 can include a chip, chipset, package, or device that includes at least one processor and at least one modem (for example, a 5G modem or other cellular modem). In some examples, the communications manager 707, or its sub-components, may be separate and distinct components. In some examples, at least some components of the communications manager 707 are implemented at least in part as software stored in a memory. For example, portions of one or more of the components of the communications manager 707 can be implemented as non-transitory code executable by the processor to perform the functions or operations of the respective component.

The receiver 710 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communications devices via various channels including control channels (for example, a physical downlink control channel (PDCCH), physical uplink control channel (PUCCH), or PSCCH) and data channels (for example, a physical downlink shared channel (PDSCH), PSSCH, a physical uplink shared channel (PUSCH)). The other wireless communications devices may include, but are not limited to, a base station 102, UE 104, or RIS 510 described with reference to FIGS. 1, 5A, 5B, 5C, 6A, and 6B.

The received information may be passed on to other components of the device 700. The receiver 710 may be an example of aspects of the receive processor 356 described with reference to FIG. 3. The receiver 710 may include a set of radio frequency (RF) chains that are coupled with or otherwise utilize a set of antennas (for example, the set of antennas may be an example of aspects of the antennas 352 described with reference to FIG. 3).

The transmitter 720 may transmit signals generated by the communications manager 707 or other components of the wireless communications device 700. In some examples, the transmitter 720 may be collocated with the receiver 710 in a transceiver. The transmitter 720 may be an example of aspects of the transmit processor 368 described with reference to FIG. 3. The transmitter 720 may be coupled with or otherwise utilize a set of antennas (for example, the set of antennas may be an example of aspects of the antennas 352 described with reference to FIG. 3), which may be antenna elements shared with the receiver 710. In some examples, the transmitter 720 is configured to transmit control information in a PUCCH, PSCCH, or PDCCH and data in a physical uplink shared channel (PUSCH), PSSCH, or PDSCH.

The communications manager 707 may be an example of aspects of the controller/processor 359 described with reference to FIG. 3. The communications manager 707 may include the RIS reservation component 730 and a RIS training component 740. Working in conjunction with the receiver 710, the RIS reservation component 730 receives both a reservation confirmation message indicating an assignment of a RIS to the first SL UE and a communication window message indicating a period of time associated with the assignment. Working in conjunction with the RIS reservation component 730 and the transmitter 720, the RIS training component 740 transmits, within the period of time, a beam training sequence for beam training the RIS to identify a beam index, of multiple beam indices, that satisfies one or more beam selection criteria. Furthermore, working in conjunction with one or more of the RIS reservation component 730, the transmitter 720, and the RIS training component 740, the communications manager 707 transmits, within the period of time via a beam associated with the beam index, data intended for transmission to a second SL UE via the RIS.

Figure 8:
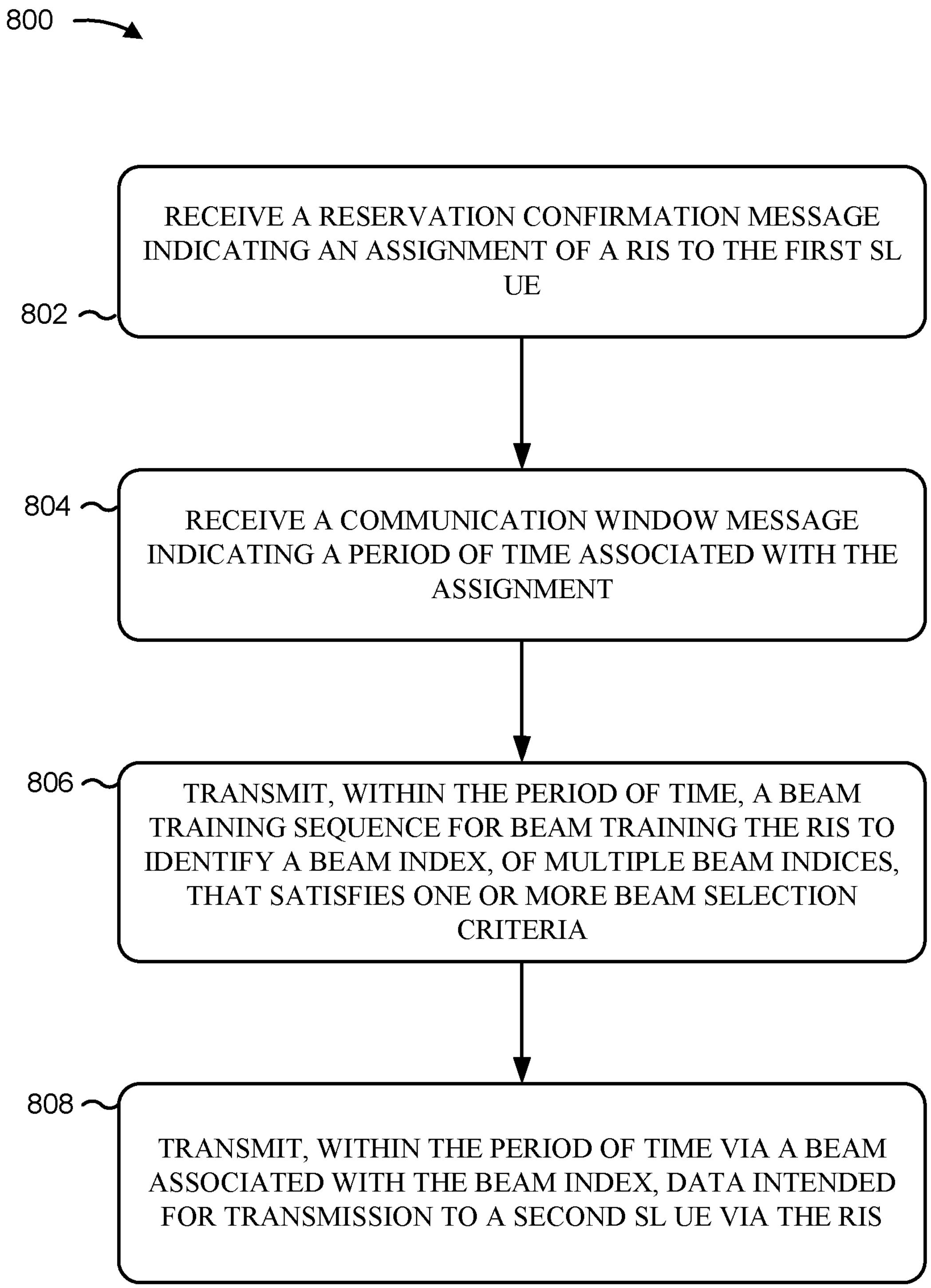
FIG. 8 is a flow diagram illustrating an example process performed by a sidelink UE, in accordance with some aspects of the present disclosure.

FIG. 8 is a flow diagram illustrating an example process 800 performed by a UE, in accordance with some aspects of the present disclosure. The UE may be an example of a UE 104 described with reference to FIGS. 1, 5A, 5B, 5C, 6A, and 6B. The example process 800 is an example of reserving a RIS. As shown in FIG. 8, the process 800 begins at block 802 by receiving a reservation confirmation message indicating an assignment of a RIS to the first SL UE. At block 804, the process 800 receives a communication window message indicating a period of time associated with the assignment. At block 806, the process 800 transmits, within the period of time, a beam training sequence for beam training the RIS to identify a beam index, of multiple beam indices, that satisfies one or more beam selection criteria. At block 808, the process 800 transmits, within the period of time via a beam associated with the beam index, data intended for transmission to a second SL UE via the RIS.

Figure 9:
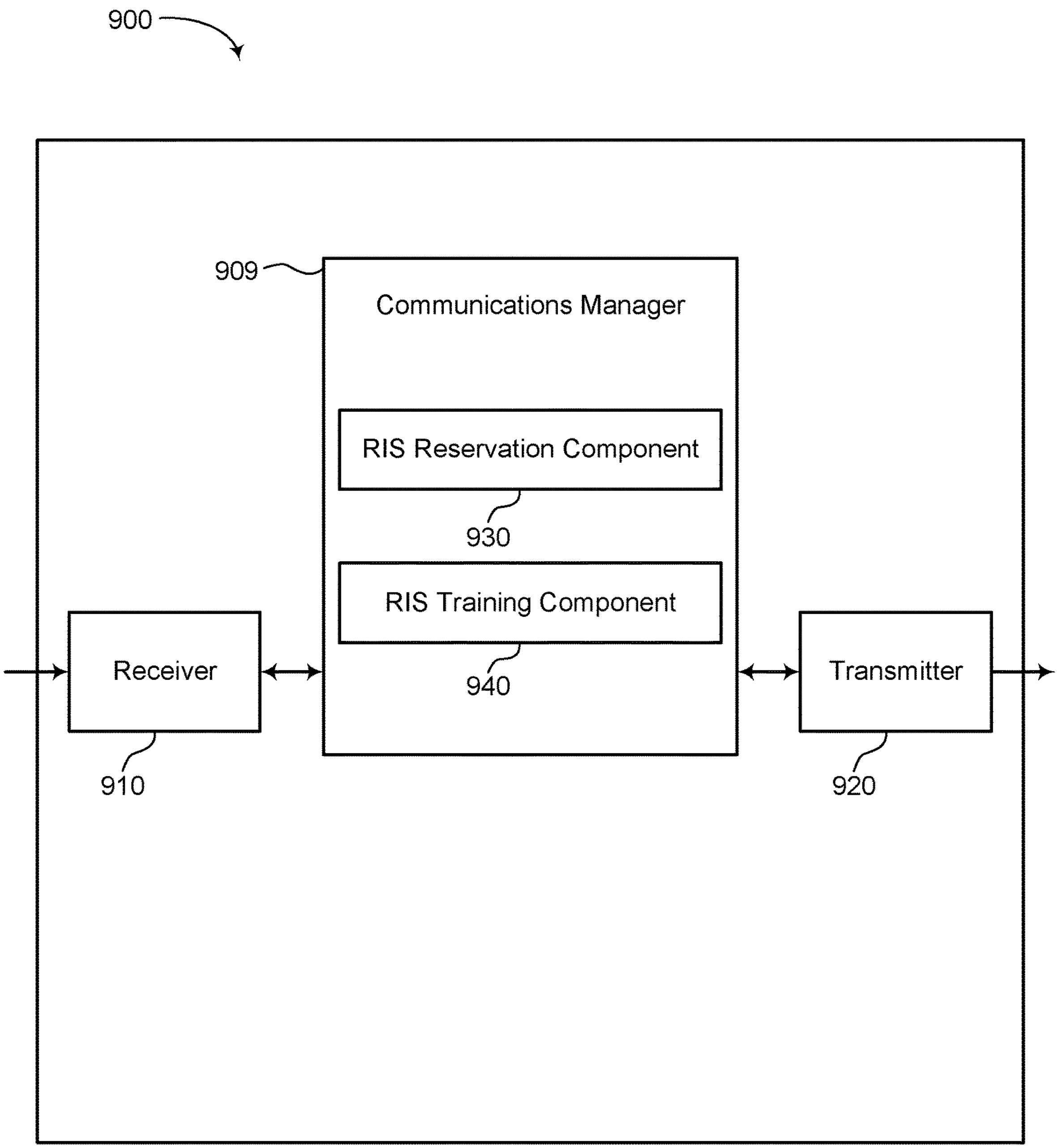
FIG. 9 is a block diagram illustrating an example wireless communication device that supports reserving a RIS, in accordance with aspects of the present disclosure.

FIG. 9 is a block diagram illustrating an example wireless communication device 900 that supports reserving a RIS, in accordance with aspects of the present disclosure. The wireless communication device 900 may be an example of aspects of a base station 102 described with reference to FIGS. 1, 5A, 5B, 5C, 6A, and 6B. The wireless communication device 900 may include a receiver 910, a communications manager 915, a RIS reservation component 930, a RIS training component 940, and a transmitter 920, which may be in communication with one another (for example, via one or more buses). In some examples, the wireless communication device 900 is configured to perform operations, including operations of the process 1000 described below with reference to FIG. 10.

In some examples, the wireless communication device 900 can include a chip, system on chip (SOC), chipset, package, or device that includes at least one processor and at least one modem (for example, a 5G modem or other cellular modem). In some examples, the communications manager 915, or its sub-components, may be separate and distinct components. In some examples, at least some components of the communications manager 915 are implemented at least in part as software stored in a memory. For example, portions of one or more of the components of the communications manager 915 can be implemented as non-transitory code executable by the processor to perform the functions or operations of the respective component.

The receiver 910 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a PUCCH or a PSCCH) and data channels (for example, a PUSCH or a PSSCH). The other wireless communication devices may include, but are not limited to, another base station 102, a RIS 510, or a UE 104, described with reference to FIGS. 1, 5A, 5B, 5C, 6A, and 6B.

The received information may be passed on to other components of the wireless communication device 900. The receiver 910 may be an example of aspects of the receive processor 370 described with reference to FIG. 3. The receiver 910 may include a set of radio frequency (RF) chains that are coupled with or otherwise utilize a set of antennas (for example, the set of antennas may be an example of aspects of the antennas 320 described with reference to FIG. 3).

The transmitter 920 may transmit signals generated by the communications manager 915 or other components of the wireless communication device 900. In some examples, the transmitter 920 may be collocated with the receiver 910 in a transceiver. The transmitter 920 may be an example of aspects of the transmit processor 316 described with reference to FIG. 3. The transmitter 920 may be coupled with or otherwise utilize a set of antennas (for example, the set of antennas may be an example of aspects of the antennas 352), which may be antenna elements shared with the receiver 910. In some examples, the transmitter 920 is configured to transmit control information in a PDCCH or a PSCCH and data in a PDSCH or PSSCH.

The communications manager 915 may be an example of aspects of the controller/processor 375 described with reference to FIG. 3. The communications manager 915 includes a RIS reservation component 930 and a RIS training component 940. In some implementations, working in conjunction with the receiver 910, the RIS reservation component 930 receives, from a first SL UE, a reservation message requesting reservation of the RIS. Working in conjunction with the transmitter 920, the RIS reservation component 930 transmits, to the first SL UE, both a reservation confirmation message indicating an assignment of the RIS to the first SL UE based on receiving the reservation message and a communication window message indicating a period of time associated with the assignment. Additionally, working in conjunction with the receiver 910, the RIS training component 940 receives, within the period of time, a beam training sequence for beam training the RIS to identify a beam index, of multiple beam indices, that satisfies one or more beam selection criteria. Working in conjunction with the transmitter 920, the RIS training component 940 transmits, to the first SL UE, a beam selection message indicating the beam index. Working in conjunction with the receiver 910, the communications manager 915 receives, within the period of time from the first SL UE via a beam associated with the beam index, data intended for transmission to a second SL UE.

Figure 10:
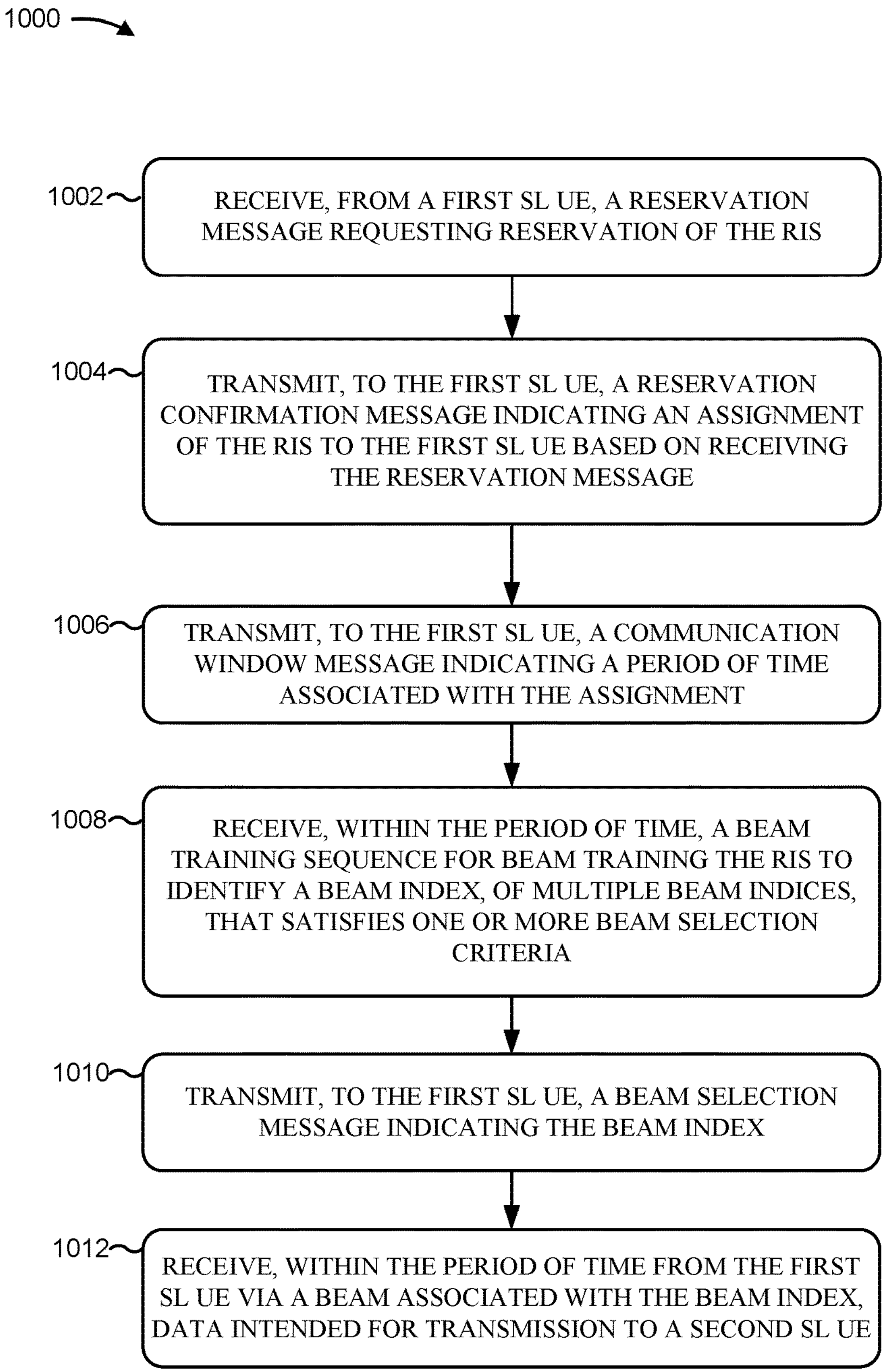
FIG. 10 is a flow diagram illustrating an example of a process performed by a wireless device, in accordance with some aspects of the present disclosure.

FIG. 10 is a flow diagram illustrating an example of a process 1000 performed by a wireless device, in accordance with some aspects of the present disclosure. The wireless device may be an example of a base station 102 described with reference to FIGS. 1, 5A, 5B, 5C, 6A, and 6B. The example process 1000 is an example of reserving a RIS. As shown in FIG. 10, the process 1000 begins at block 1002, by receiving, from a first SL UE, a reservation message requesting reservation of the RIS. At block 1004, the process 1000 transmits, to the first SL UE, a reservation confirmation message indicating an assignment of the RIS to the first SL UE based on receiving the reservation message. At block 1006, the process 1000 transmits, to the first SL UE, a communication window message indicating a period of time associated with the assignment. At block 1008, the process 1000 receives, within the period of time, a beam training sequence for beam training the RIS to identify a beam index, of multiple beam indices, that satisfies one or more beam selection criteria. At block 1010, the process 1000 transmits, to the first SL UE, a beam selection message indicating the beam index. At block 1012, the process 1000 receives, within the period of time from the first SL UE via a beam associated with the beam index, data intended for transmission to a second SL UE.

Figure 11:
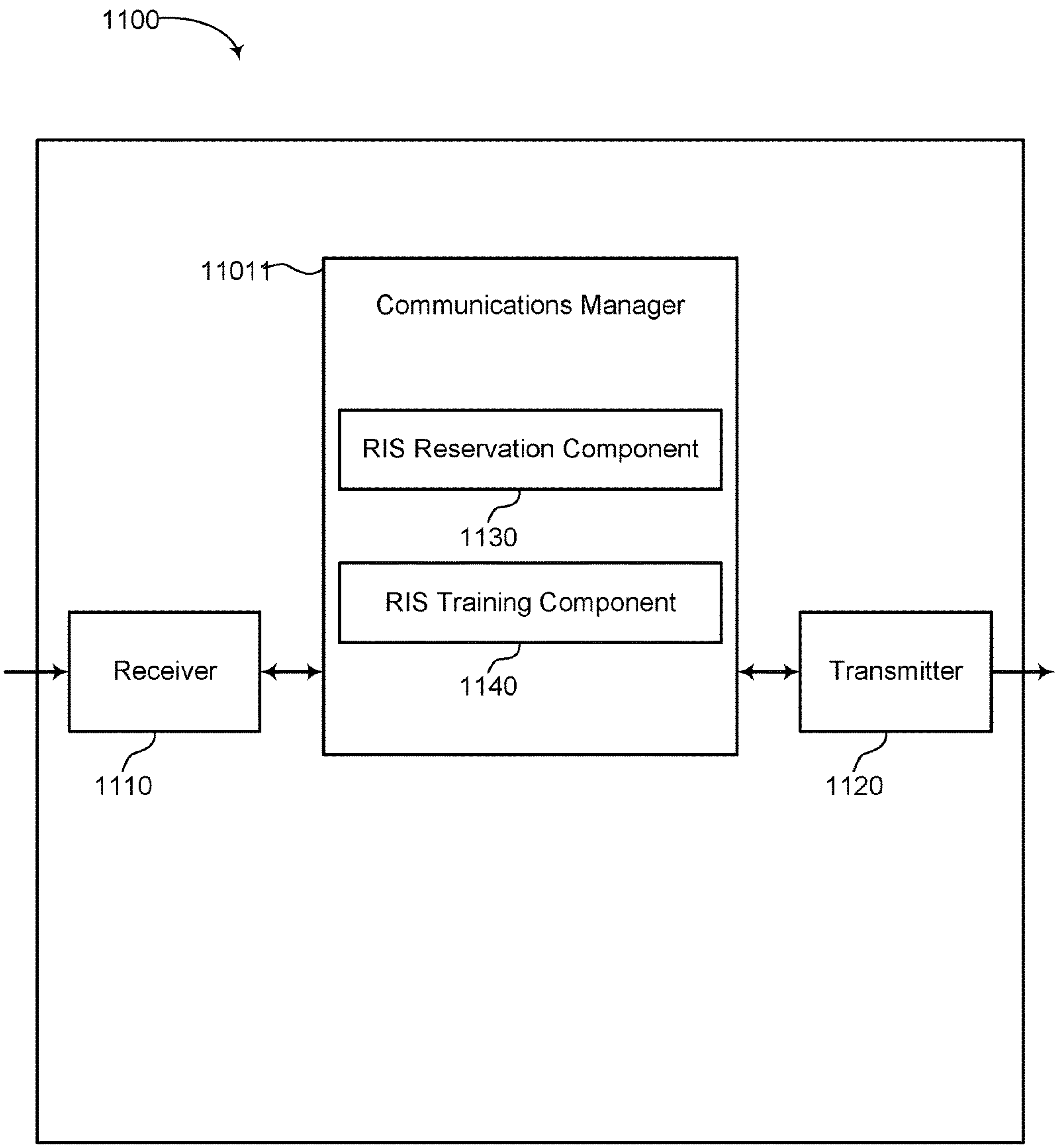
FIG. 11 is a block diagram illustrating an example wireless communication device that supports reserving a RIS, in accordance with aspects of the present disclosure.

FIG. 11 is a block diagram illustrating an example wireless communication device 1100 that supports reserving a RIS, in accordance with aspects of the present disclosure. The wireless communication device 1100 may be an example of aspects of a RIS 510 described with reference to FIGS. 5A, 5B, 5C, 6A, and 6B. The wireless communication device 1100 may include a receiver 1110, a communications manager 1115, a RIS reservation component 1130, a RIS training component 1140, and a transmitter 1120, which may be in communication with one another (for example, via one or more buses). In some examples, the wireless communication device 1100 is configured to perform operations, including operations of the process 1200 described below with reference to FIG. 12.

In some examples, the wireless communication device 1100 can include a chip, system on chip (SOC), chipset, package, or device that includes at least one processor and at least one modem (for example, a 5G modem or other cellular modem). In some examples, the communications manager 1115, or its sub-components, may be separate and distinct components. In some examples, at least some components of the communications manager 1115 are implemented at least in part as software stored in a memory. For example, portions of one or more of the components of the communications manager 1115 can be implemented as non-transitory code executable by the processor to perform the functions or operations of the respective component.

The receiver 1110 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a PUCCH or a PSCCH) and data channels (for example, a PUSCH or a PSSCH). The other wireless communication devices may include, but are not limited to, another base station 102 or a UE 104, described with reference to FIGS. 1, 5A, 5B, 5C, 6A, and 6B.

The received information may be passed on to other components of the wireless communication device 1100. The receiver 1110 may include a set of radio frequency (RF) chains that are coupled with or otherwise utilize a set of antennas.

The transmitter 1120 may transmit signals generated by the communications manager 1115 or other components of the wireless communication device 1100. In some examples, the transmitter 1120 may be collocated with the receiver 1110 in a transceiver. The transmitter 1120 may be coupled with or otherwise utilize a set of antennas, which may be antenna elements shared with the receiver 1110. In some examples, the transmitter 1120 is configured to transmit control information in a PDSCH or a PSCCH and data in a PDSCH or a PSSCH.

The communications manager 1115 includes a RIS reservation component 1130 and a RIS training component 1140. In some implementations, working in conjunction with the receiver 1110, the RIS reservation component 1130 transmits, to a first SL UE, both a reservation confirmation message indicating an assignment of a RIS to the first SL UE and a communication window message indicating a period of time associated with the assignment. Additionally, working in conjunction with one or more of the receiver 1110 and the transmitter 1120, the RIS training component 1140 receives, from the RIS, a first beam selection message indicating a beam index, of a plurality of beam indices, that satisfies one or more beam selection criteria, and also transmits, to the first SL UE, a second beam selection message indicating the beam index.

Figure 12:
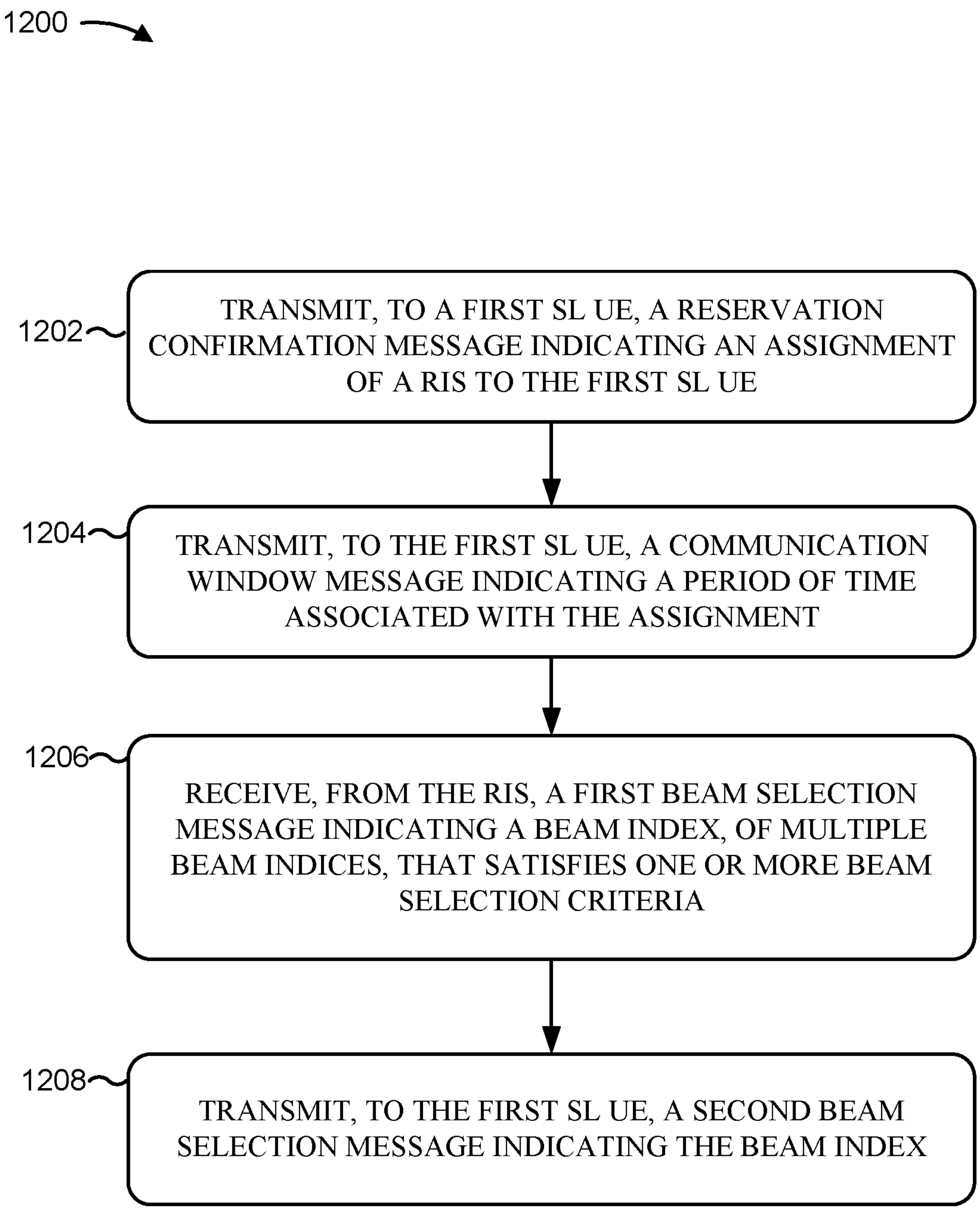
FIG. 12 is a flow diagram illustrating an example of a process performed by a wireless device, in accordance with some aspects of the present disclosure.

FIG. 12 is a flow diagram illustrating an example of a process 1200 performed by a wireless device, in accordance with some aspects of the present disclosure. The wireless device may be an example of a RIS 510 described with reference to FIGS. 5A, 5B, 5C, 6A, and 6B. The example process 1200 is an example of reserving a RIS. As shown in FIG. 12, the process 1200 begins at block 1202, by transmitting, to a first SL UE, a reservation confirmation message indicating an assignment of a RIS to the first SL UE. At block 1204, the process 1200 transmits, to the first SL UE, a communication window message indicating a period of time associated with the assignment. At block 1206, the process 1200 receive, from the RIS, a first beam selection message indicating a beam index, of a plurality of beam indices, that satisfies one or more beam selection criteria. At block 1208, the process 1200 transmits, to the first SL UE, a second beam selection message indicating the beam index.

Implementation examples are described in the following numbered clauses:

Clause 1. A method for wireless communication by a first SL UE, comprising: receiving a reservation confirmation message indicating an assignment of a RIS to the first SL UE; receiving a communication window message indicating a period of time associated with the assignment; transmitting, within the period of time, a beam training sequence for beam training the RIS to identify a beam index, of a plurality of beam indices, that satisfies one or more beam selection criteria; and transmitting, within the period of time via a beam associated with the beam index, data intended for transmission to a second SL UE via the RIS.

Clause 2. The method of Clause 1, further comprising transmitting a reservation message requesting reservation of the RIS, wherein the reservation confirmation message is received based on transmitting the reservation message.

Clause 3. The method of Clause 2, wherein the reservation message, the beam training sequence, and the data are transmitted to the RIS.

Clause 4. The method of Clause 2, wherein the reservation message, the beam training sequence, and the data are transmitted to a base station.

Clause 5. The method of Clause 4, wherein the reservation message is a service request.

Clause 6. The method of any one of Clause 1-5, wherein: the reservation message is transmitted on a group of predefined resources from a plurality of groups of predefined resources; and each group of predefined resources is associated with a respective communication priority from a plurality of communication priorities.

Clause 7. The method of any one of Clauses 1-6, further comprising receiving, from a base station, a resource allocation message indicating SL communication resources, wherein: the first SL UE and the base station operate in accordance with SL mode 1; and the resource allocation message includes the reservation confirmation message.

Clause 8. The method of any one of Clauses 1-7, further comprising receiving a resource pool message indicating a resource pool for training the RIS and transmitting the data.

Clause 9. The method of any one of Clauses 1-8, further comprising receiving a beam selection message indicating the beam index, wherein the beam index satisfies the one or more beam selection criteria based on the beam index being associated with one or more of a highest spectral efficiency, a highest RSRP, a highest RSRQ, a highest channel rank, or a lowest SINR.

Clause 10. A method for wireless communication by a RIS, comprising: receiving, from a first SL UE, a reservation message requesting reservation of the RIS; transmitting, to the first SL UE, a reservation confirmation message indicating an assignment of the RIS to the first SL UE based on receiving the reservation message; transmitting, to the first SL UE, a communication window message indicating a period of time associated with the assignment; receiving, within the period of time, a beam training sequence for beam training the RIS to identify a beam index, of a plurality of beam indices, that satisfies one or more beam selection criteria; transmitting, to the first SL UE, a beam selection message indicating the beam index; and receiving, within the period of time from the first SL UE via a beam associated with the beam index, data intended for transmission to a second SL UE.

Clause 11. The method of Clause 10, further comprising transmitting a resource pool message indicating a resource pool for transmitting both the beam training sequence and the data.

Clause 12. The method of Clause 10-11, wherein the beam index satisfies the one or more beam selection criteria based on the beam index being associated with one or more of a highest spectral efficiency, a highest RSRP, a highest channel rank, a highest RSRQ, or a lowest SINR.

Clause 13. The method of any one of Clauses 10-12, wherein: the reservation message is received on a group of predefined SL resources from a plurality of groups of predefined SL resources; and each group of predefined SL resources is associated with a respective communication priority from a plurality of communication priorities.

Clause 14. The method of any one of Clauses 10-13, wherein the reservation message is a sequence-based reference signal received on one or more predefined SL resources.

Clause 15. A method for wireless communication by base station, comprising: transmitting, to a first SL UE, a reservation confirmation message indicating an assignment of a RIS to the first SL UE; transmitting, to the first SL UE, a communication window message indicating a period of time associated with the assignment; receiving, from the RIS, a first beam selection message indicating a beam index, of a plurality of beam indices, that satisfies one or more beam selection criteria; and transmitting, to the first SL UE, a second beam selection message indicating the beam index.

Clause 16. The method of Clause 15, further comprising transmitting, to the first SL UE, a resource pool message indicating a resource pool for transmitting both a beam training sequence and data to the RIS.

Clause 17. The method of any one of Clauses 15-16, wherein the first beam selection message is received based on the first SL UE transmitting a beam training sequence for beam training the RIS to identify the beam index; and the beam index satisfies the one or more beam selection criteria based on the beam index being associated with one or more of a highest spectral efficiency, a highest RSRP, a highest channel rank, a highest RSRQ, or a lowest SINR.

Clause 18. The method of any one of Clauses 15-17, further comprising receiving a reservation message requesting reservation of the RIS, wherein the reservation confirmation message is transmitted based on receiving the reservation message.

Clause 19. The method of Clause 18, wherein the reservation message is a service request.

Clause 20. The method of Clause 18, further comprising forwarding the reservation message to a controller associated with the RIS.

Clause 21. The method of any one of Clauses 15-20, further comprising transmitting, to the first SL UE, a resource allocation message indicating SL communication resources, wherein: the first SL UE and a base station operate in accordance with SL mode 1; and the resource allocation message includes the reservation confirmation message.

The foregoing disclosure provides illustration and description, but is not intended to be exhaustive or to limit the aspects to the precise form disclosed. Modifications and variations may be made in light of the above disclosure or may be acquired from practice of the aspects.

As used, the term “component” is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication by a first sidelink (SL) user equipment (UE), comprising:
- receiving a reservation confirmation message indicating an assignment of a reconfigurable intelligent surface (RIS) to the first SL UE;
- receiving a communication window message indicating a period of time associated with the assignment;
- transmitting, within the period of time, a beam training sequence for beam training the RIS to identify a beam index, of a plurality of beam indices, that satisfies one or more beam selection criteria; and
- transmitting, within the period of time via a beam associated with the beam index, data intended for transmission to a second SL UE via the RIS.

2. The method of claim 1, further comprising transmitting a reservation message requesting reservation of the RIS, wherein the reservation confirmation message is received based on transmitting the reservation message.

3. The method of claim 2, wherein the reservation message, the beam training sequence, and the data are transmitted to the RIS.

4. The method of claim 2, wherein the reservation message, the beam training sequence, and the data are transmitted to a base station.

5. The method of claim 4, wherein the reservation message is a service request.

6. The method of claim 2, wherein:
- the reservation message is transmitted on a group of predefined resources from a plurality of groups of predefined resources; and
- each group of predefined resources is associated with a respective communication priority from a plurality of communication priorities.

7. The method of claim 1, further comprising receiving, from a base station, a resource allocation message indicating SL communication resources, wherein:
- the first SL UE and the base station operate in accordance with SL mode 1; and
- the resource allocation message includes the reservation confirmation message.

8. The method of claim 1, further comprising receiving a resource pool message indicating a resource pool for training the RIS and transmitting the data.

9. The method of claim 1, further comprising receiving a beam selection message indicating the beam index, wherein the beam index satisfies the one or more beam selection criteria based on the beam index being associated with one or more of a highest spectral efficiency, a highest reference signal received power (RSRP), a highest channel rank, a highest reference signal received quality (RSRQ), or a lowest signal to interference and noise ratio (SINR).

10. A method for wireless communication by a reconfigurable intelligent surface (RIS), comprising:
- receiving, from a first sidelink (SL) user equipment (UE), a reservation message requesting reservation of the RIS;
- transmitting, to the first SL UE, a reservation confirmation message indicating an assignment of the RIS to the first SL UE based on receiving the reservation message;
- transmitting, to the first SL UE, a communication window message indicating a period of time associated with the assignment;
- receiving, within the period of time, a beam training sequence for beam training the RIS to identify a beam index, of a plurality of beam indices, that satisfies one or more beam selection criteria;
- transmitting, to the first SL UE, a beam selection message indicating the beam index; and
- receiving, within the period of time from the first SL UE via a beam associated with the beam index, data intended for transmission to a second SL UE.

11. The method of claim 10, further comprising transmitting a resource pool message indicating a resource pool for transmitting both the beam training sequence and the data.

12. The method of claim 11, wherein the beam index satisfies the one or more beam selection criteria based on the beam index being associated with one or more of a highest spectral efficiency, a highest reference signal received power (RSRP), a highest channel rank, a highest reference signal received quality (RSRQ), or a lowest signal to interference and noise ratio (SINR).

13. The method of claim 10, wherein:
- the reservation message is received on a group of predefined SL resources from a plurality of groups of predefined SL resources; and
- each group of predefined SL resources is associated with a respective communication priority from a plurality of communication priorities.

14. The method of claim 10, wherein the reservation message is a sequence-based reference signal received on one or more predefined SL resources.

15. A method for wireless communication by base station, comprising:
- transmitting, to a first sidelink (SL) user equipment (UE), a reservation confirmation message indicating an assignment of a reconfigurable intelligent surface (RIS) to the first SL UE;
- transmitting, to the first SL UE, a communication window message indicating a period of time associated with the assignment;
- receiving, from the RIS, a first beam selection message indicating a beam index, of a plurality of beam indices, that satisfies one or more beam selection criteria; and
- transmitting, to the first SL UE, a second beam selection message indicating the beam index.

16. The method of claim 15, further comprising transmitting, to the first SL UE, a resource pool message indicating a resource pool for transmitting both a beam training sequence and data to the RIS.

17. The method of claim 15, wherein:

the first beam selection message is received based on the first SL UE transmitting a beam training sequence for beam training the RIS to identify the beam index; and the beam index satisfies the one or more beam selection criteria based on the beam index being associated with one or more of a highest spectral efficiency, a highest reference signal received power (RSRP), a highest channel rank, a highest reference signal received quality (RSRQ), or a lowest signal to interference and noise ratio (SINR).

18. The method of claim 15, further comprising receiving a reservation message requesting reservation of the RIS, wherein the reservation confirmation message is transmitted based on receiving the reservation message.

19. The method of claim 18, wherein the reservation message is a service request.

20. The method of claim 18, further comprising forwarding the reservation message to a controller associated with the RIS.

21. The method of claim 15, further comprising transmitting, to the first SL UE, a resource allocation message indicating SL communication resources, wherein:

the first SL UE and a base station operate in accordance with SL mode 1; and the resource allocation message includes the reservation confirmation message.

22. An apparatus for wireless communications at a first sidelink (SL) user equipment (UE), comprising:

a processor; and a memory coupled with the processor and storing instructions operable, when executed by the processor, to cause the apparatus to:

receive a reservation confirmation message indicating an assignment of a reconfigurable intelligent surface (RIS) to the first SL UE;

receive a communication window message indicating a period of time associated with the assignment;

transmit, within the period of time, a beam training sequence for beam training the RIS to identify a beam index, of a plurality of beam indices, that satisfies one or more beam selection criteria; and transmit, within the period of time via a beam associated with the beam index, data intended for transmission to a second SL UE via the RIS.

23. The apparatus of claim 22, wherein execution of the instructions further cause the apparatus to transmit a reservation message requesting reservation of the RIS, wherein the reservation confirmation message is received based on transmitting the reservation message.

24. The apparatus of claim 23, wherein the reservation message, the beam training sequence, and the data are transmitted to the RIS.

25. The apparatus of claim 23, wherein the reservation message, the beam training sequence, and the data are transmitted to a base station.

26. The apparatus of claim 25, wherein the reservation message is a service request.

27. The apparatus of claim 23, wherein:

the reservation message is transmitted on a group of predefined resources from a plurality of groups of predefined resources; and each group of predefined resources is associated with a respective communication priority from a plurality of communication priorities.

28. The apparatus of claim 22, wherein execution of the instructions further cause the apparatus to receive, from a base station, a resource allocation message indicating SL communication resources, wherein:

the first SL UE and the base station operate in accordance with SL mode 1; and the resource allocation message includes the reservation confirmation message.

29. The apparatus of claim 22, wherein execution of the instructions further cause the apparatus to receive a resource pool message indicating a resource pool for training the RIS and transmitting the data.

30. The apparatus of claim 22, wherein execution of the instructions further cause the apparatus to receive a beam selection message indicating the beam index, wherein the beam index satisfies the one or more beam selection criteria based on the beam index being associated with one or more of a highest spectral efficiency, a highest reference signal received power (RSRP), a highest channel rank, a highest reference signal received quality (RSRQ), or a lowest signal to interference and noise ratio (SINR).

* * * * *